United States Patent
Liou

(10) Patent No.: US 7,894,583 B2
(45) Date of Patent: Feb. 22, 2011

(54) METHOD FOR AUTOMATIC INFORMATION CAPTURING OF COMMUNICATION EVENTS

(75) Inventor: Huoy-Yu Liou, Los Altos, CA (US)

(73) Assignee: Elmobile Inc., Mountain View, CA (US)

( * ) Notice: Subject to any disclaimer, the term of this patent is extended or adjusted under 35 U.S.C. 154(b) by 1184 days.

(21) Appl. No.: 11/465,015

(22) Filed: Aug. 16, 2006

(65) Prior Publication Data

US 2007/0041541 A1 Feb. 22, 2007

Related U.S. Application Data

(60) Provisional application No. 60/595,940, filed on Aug. 19, 2005.

(51) Int. Cl.
*H04M 1/56* (2006.01)
*H04M 15/06* (2006.01)

(52) U.S. Cl. .......................... 379/142.06; 379/142.11; 455/415

(58) Field of Classification Search ............ 379/142.01, 379/142.04, 142.06, 142.11, 142.14, 142.17, 379/142.18, 245, 247; 455/415, 418, 432.2, 455/432.3, 517

See application file for complete search history.

(56) References Cited

U.S. PATENT DOCUMENTS

| | | | | |
|---|---|---|---|---|
| 5,581,599 A * | 12/1996 | Tsuji et al. | ............. | 455/415 |
| 5,999,525 A | 12/1999 | Krishnaswamy et al. | | |
| 6,005,927 A * | 12/1999 | Rahrer et al. | ......... | 379/142.01 |
| 6,427,064 B1 * | 7/2002 | Henderson | .................... | 340/5.1 |
| 6,529,724 B1 * | 3/2003 | Khazaka et al. | ............. | 455/405 |
| 6,535,596 B1 | 3/2003 | Frey et al. | | |
| 6,580,787 B1 | 6/2003 | Akhteruzzaman et al. | | |
| 6,680,935 B1 | 1/2004 | Kung et al. | | |
| 6,769,013 B2 | 7/2004 | Frees et al. | | |
| 6,782,268 B1 | 8/2004 | Thompson et al. | | |
| 6,961,420 B2 * | 11/2005 | DeSalvo | ................. | 379/355.02 |
| 6,980,993 B2 | 12/2005 | Horvitz et al. | | |
| 7,187,760 B2 * | 3/2007 | Brandt et al. | ................ | 379/126 |
| 7,602,892 B2 * | 10/2009 | Cragun | ................... | 379/201.01 |
| 2002/0098831 A1 | 7/2002 | Castell et al. | | |
| 2002/0191596 A1 * | 12/2002 | Moyano et al. | ............. | 370/352 |
| 2003/0017824 A1 * | 1/2003 | Uhlmann | ..................... | 455/416 |
| 2003/0088427 A1 | 5/2003 | Elsey et al. | | |

(Continued)

FOREIGN PATENT DOCUMENTS

WO 2008/021578 A1 2/2008

OTHER PUBLICATIONS

EPO/ISA, "Notification of Transmittal of the International Search Report and the Written Opinion of the International Searching Authority, or the Declaration", mailed Nov. 20, 2007 in corresponding PCT/US07/61991, 11 pages.

*Primary Examiner*—Binh K Tieu
(74) *Attorney, Agent, or Firm*—Davis Wright Tremaine LLP

(57) ABSTRACT

This invention provides a method for automatically integrating and assembling the timestamp of a communication event with the identification of the communicating parties and available event attributes, presenting prompts for user entries on a terminal or interface device, storing user annotated information related to said communication event, and transmitting saved information of said communication events to another terminal device or information system. The invention also relates to a computer program, a device, and a system encapsulating computer programs realizing the method.

13 Claims, 30 Drawing Sheets

U.S. PATENT DOCUMENTS

| | | |
|---|---|---|
| 2003/0220898 A1 | 11/2003 | Hoffman et al. |
| 2004/0029568 A1* | 2/2004 | DeLuca et al. ............ 455/412.1 |
| 2004/0167877 A1 | 8/2004 | Thompson, III |
| 2004/0209677 A1 | 10/2004 | Park et al. |
| 2004/0249650 A1 | 12/2004 | Freedman et al. |
| 2004/0254823 A1 | 12/2004 | Tracey et al. |
| 2005/0008135 A1* | 1/2005 | Bressler ................. 379/211.01 |
| 2005/0010656 A1 | 1/2005 | Lee |
| 2005/0117736 A1 | 6/2005 | Vehkalahti |
| 2005/0138177 A1* | 6/2005 | Davis ......................... 709/227 |
| 2006/0034434 A1* | 2/2006 | Kashi ...................... 379/93.07 |

* cited by examiner

The time of the Call Event is adjusted to
the local time zone setting that user had
selected previously.

An example of User configurable policy:
For a saved call event, Add its follow-up reminder
and CC a colleague notes on the call event.

The result of User configured policy:
Saved and cross-linked call event,
its follow-up reminder,
and notes on the call event sent to colleague's email.

Auto-generated Call Logger page with Call Type, Time of the Call, Caller ID, entry prompts for a Calendar Event, and selection links.
Alert is sounded when this page displays.

Auto-generated Call Logger page with Call Type, Time of the Call, Caller ID, Name found in Phone book, entry prompts for a Calendar Event, and selection links. Alert is sounded when this page displays.

Call Logger page with User-modified
entries for saving
the new number to phone book and
the call event to calendar simultaneously Call Logger page with
User annotated entries for saving
the call event to calendar User saved this call with notes as a calendar event and new number as a new contact in phone book. User also asked to link the call event to the new contact in phone book.

1611
1612

User saved this call with notes and found contact name as a calendar event.
For an existing contact, this call event is automatically added to a cross-reference Events with Contact list

To check the simultaneously saved
Call Event and New Contact,
User can use the Find function to search
for a common keyword in both phone book
and calendar modules.

The Find module lists search results found
in calendar and phone book

An example of cross-linked data: Contact to events for a newly added callerID in calendar.

An example of cross-linked data: Contact to events in calendar for an existing name in phone book.

An example of cross-linked data: Saved call event linked with the new contact An example of cross-linked data:
Saved call event, its follow-up reminder,
and notes on the call event sent to colleague's email
are linked to an existing name in phone book An example of cross-linked todo to contact (1): schedule an event with a contact An example of cross-linked todo to contact (2): set the reminder for the event An example of cross-linked todo to contact (3): reminder page with a link to contact An example of cross-linked todo to contact (4): linked contact phone and email page An example of post-annotation data processing: uploading events list to a remote server Status summary of the upload operation

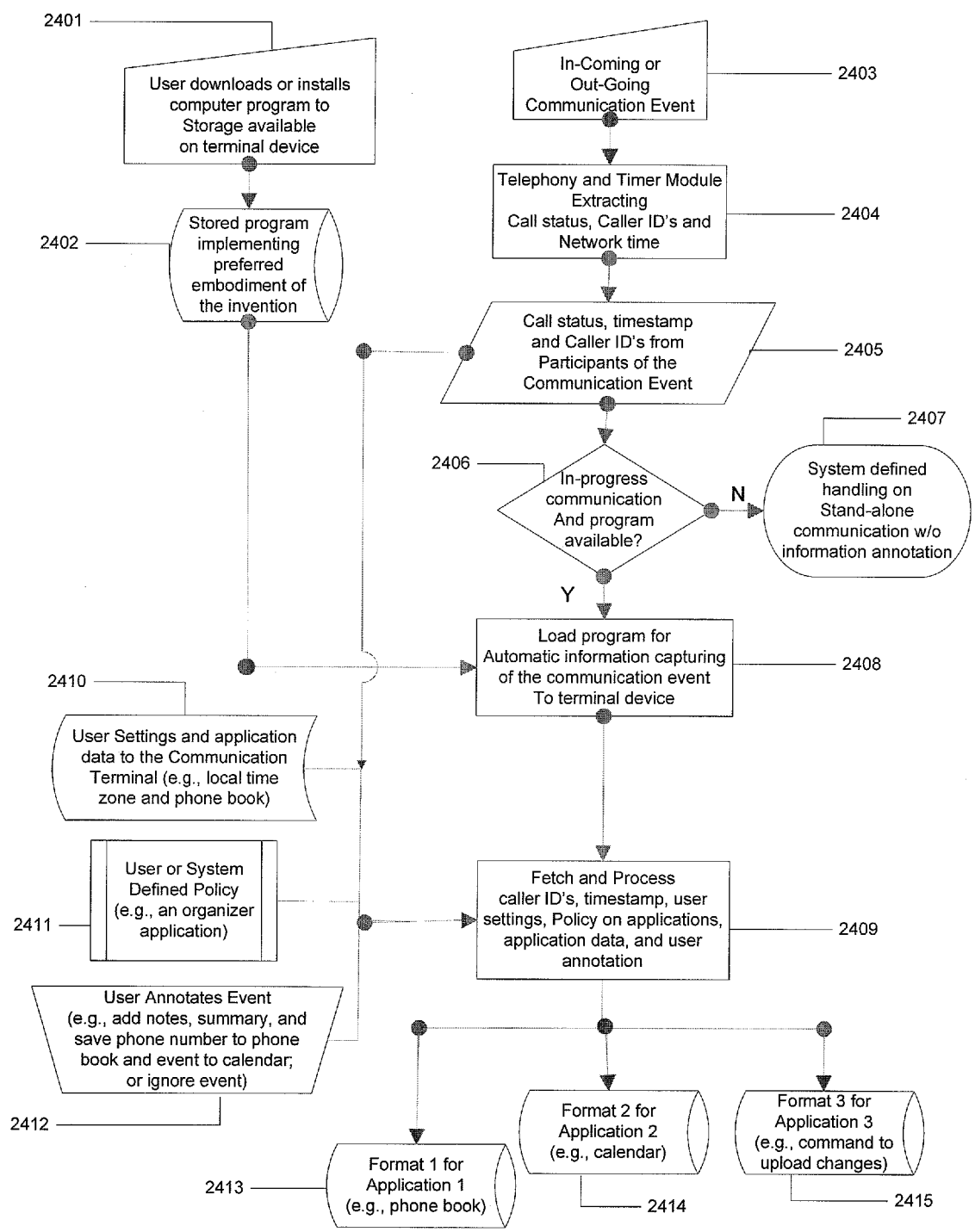

METHOD FOR AUTOMATIC INFORMATION CAPTURING OF COMMUNICATION EVENTS

CROSS-REFERENCE TO RELATED APPLICATION

This application claims the benefit of U.S. Provisional Application No. 60/595,940, filed Aug. 19, 2005, entitled "Method for Automatic Information Capturing of Communication Events," which application is incorporated in its entirety by reference as if fully set forth herein.

FIELD OF THE INVENTION

This invention relates to a method for automatic information capturing of communication events and executing user policy associated with the event on a terminal or interface device and transmitted to related information system. This invention relates to a computer program and device implementing the method. Additionally, this invention relates to a system encapsulating computer programs implementing the method.

BACKGROUND OF THE INVENTION

Mobile devices have separate lists of call and message events. It is cumbersome for users to transfer such information to journal even on the same mobile device. As mobile devices play more crucial role in personal and professional communication, mobile users need automatic logger to capture, organize, and transfer such events with editable attributes or information to calendar, agenda, or bulletin on mobile device for record keeping and improves work efficiency.

Although each voice call or mobile message is logged by the mobile device, the information is kept separately in different categories outside of user's calendar. Currently, mobile device user needs to look for a category, record specific date, time, abstract of the correspondence, and to manually transfer all related information of a call or message to a specific program. Such manual process is error-prone and time-consuming for a user who needs efficient information capture from a mobile device.

With fast development of network speed and versatile device functionality, conventional communication events such as call, messaging, broadcasting, documentation transmittal, etc., can be realized on any terminal device with network connectivity and relevant communication applications. On certain communication systems containing several types of terminal devices, vital information related to a communication event is assembled from different sources in a fragmented process similar to the scenario in mobile devices indicated above. As more information and entities are involved in a communication event, automatic integration of communication events with corresponding information achieves reliability and efficiency.

SUMMARY OF THE INVENTION

Accordingly, an object of the present invention is to provide a method, in which caller identification (CallerID) or Return Address of the communicating parties are automatically captured and integrated with timestamp of the communication event to an entry page on a terminal device prompting for user preference and annotation. An embodiment of the invention is for a custom-built application working with native communication procedural interface components of the terminal device and with contact data to obtain caller identification in a human understandable format, e.g., caller's name, or phone number, or email address, etc.

In order to accomplish the above object, an embodiment of the present invention is automatically combining the human understandable caller identity with a timestamp local to the terminal device. Integrated information is presented to the mobile user with prompts in textual, voice, or multimedia format requesting for optional annotation to this communication event.

A preferred embodiment of the invention is automatically including available attributes of the communication event in human recognizable formats in conjunction with rendering prompts for user's annotation to the communication event. In an embodiment, event attributes such as voice or message type can be captured from native components on the terminal device in textual, vocal, and multimedia formats.

In accordance with another embodiment of the present invention, the automatically generated user prompts are in various forms such as commands, open questions, menus, options, etc. to best represent the characteristics of the custom-built application. An embodiment of the invention automates communication event generation for mobile device users to save to custom applications such as calendar, agenda, bulletin, etc. for further data or information processing.

Another object of the present invention is to provide a method for automatically integrating and storing user annotations to the communication event with event timestamp, contact identifications, and related event attributes.

In order to accomplish the above object, an embodiment of the invention automates the incorporating of user annotation such as key words, labels, memos, etc. captured by the user prompts, with the communication event in a custom-built application. Various formats of user annotations can be utilized for best efficiency in a custom-built application. The second embodiment of the invention can be a voice-based application which integrates a communication event with audio annotation from user, and saves the annotated event to the terminal device. Stored event information can be retrieved automatically to a speech project management system without further manipulation from the user.

Another object of the invention is to provide a method for automatically retrieving and transmitting of the stored, augmented information of the communication event to current or secondary devices and systems through various network connections.

In an embodiment of the invention, saved communication events can be viewed, edited, and transferred from the terminal device by a data processing application, a component or means performing tasks such as searching and archiving, to a remote server via a network connection.

There is a computer program implementing the invention comprises integrating and assembling the timestamp of a communication event with the identification of the communicating parties and available event attributes, presenting prompts for user entries on a terminal or interface device, storing user annotated information related to said communication event, and transmitting saved information of said communication events to another terminal device or information system for data processing purpose.

In accordance with another embodiment of the present invention, there is a provided software product that comprises a method for integrating and assembling the timestamp of a communication event with the identification of the communicating parties and available event attributes, presenting prompts for user entries or automatic notification of said communication event, storing information related to said communication event on interface devices and/or information servers, transmitting saved information of said communication events to another terminal device or information system for data processing purpose.

The device implementing the invention comprises means for integrating and assembling the timestamp of a communication event with the identification of the communicating parties and available event attributes, for presenting prompts for user entries or automatic notification of said event, for storing information related to said communication event, for transmitting stored data of said communication events to another terminal device or information system for data processing purpose.

The system encapsulating computer programs implementing the invention comprises integrating and assembling the timestamp of a communication event with the identification of the communicating parties and available event attributes, presenting prompts for user entries or automatic notification of said event, storing information related to said event on persistent storage, transmitting stored information of said communication events to another terminal device or information system for data processing purpose.

BRIEF DESCRIPTION OF THE DRAWINGS

The above and other objects, features and advantages of the present invention will be more apparent from the following detailed description with reference to the appended principle drawings, in which:

FIG. 24 is a flow diagram of a system executing a downloaded or installed computer program which implements the invention from a storage medium available to the communication terminal device.

DETAILED DESCRIPTION OF THE PREFERRED EMBODIMENTS

Figure 1:
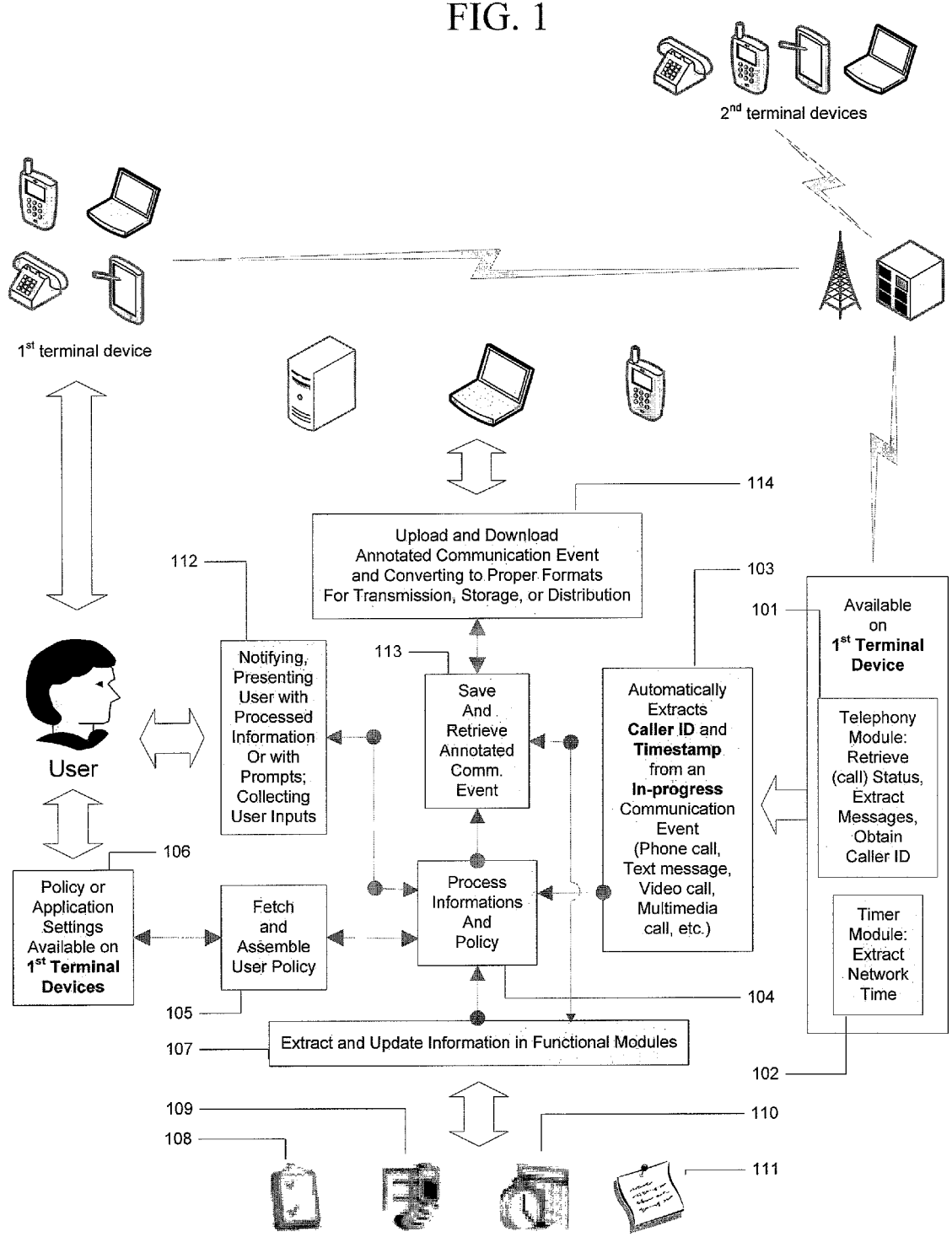
FIG. 1 is a sample functional block diagram of the invention illustrating the automatic information annotation to a communication event dictated by the user and application policy settings.

Hereinafter, certain embodiments of the present invention will be described with reference to the accompanying drawings. In the drawings, only details necessary for understanding the invention are shown. Also, in the following description of the present invention, a detailed description of known functions and configurations which are evident for anyone skilled in the art will be omitted in order to emphasize the characteristics of the invention.

In a preferred embodiment of the present invention illustrated in FIG. 1, a functional block diagram of the method is implemented on a communication terminal device. A user establishes a telephony communication event on the first terminal device with one or plurality of second terminal devices through a communication network. On the first terminal device, there is a commonly available telephony module 101 which retrieves the communication (or call) status, extracts the message body (or content) of the communication, and obtains the caller identification (caller ID) of other calling parties if available. The commonly available telephony module can be a caller ID box or an Application Programming Interface (API) for on-device software. Another on-device universal timer module 102 extracts the time of the communication event.

Information such as call status, caller ID's, and time stamp of the communication event are passed from the telephony and timer modules to a telephony extraction module 103 to invoke the event-driven information capturing and annotation process 104. Generic caller ID's and time stamps are converted to formats related to the target applications also 103. In the preferred embodiment of the invention, converted caller ID's are phone numbers for a phone book 109 and the time stamp is adjusted to the local time zone for a calendar 110.

Separately, the user can select policy or settings which constitute a target application with desired features available on the first terminal device 106. As shown in the preferred embodiment of the invention, such application can be a customized organizer which integrates phone book 109, calendar 110, and note pad 111 available on the first terminal device.

The user's selection of policy is assembled 105 and processed 104 through a data extraction interface 107 which interacts with various stand-alone applications. In the preferred embodiment of the invention, processed user policy is stored as custom application settings 108.

As the in-progress status of the communication event is detected 103, the information and policy process module 104 collects policy settings, related application data, caller ID's and time stamp related to the communication event. At the end of the communication event, the user is notified and prompted with collected information and entries for further annotation or selection 112.

If user annotates the communication event with additional information and saves related information 113 to the call event, data for various applications are saved through the data extraction interface 107 to storage available to the first terminal device.

Stored event information with annotation can be retrieved 113 through the data extraction interface 107 to be further transmitted to other systems or devices for specific purposes 114.

Figure 2:
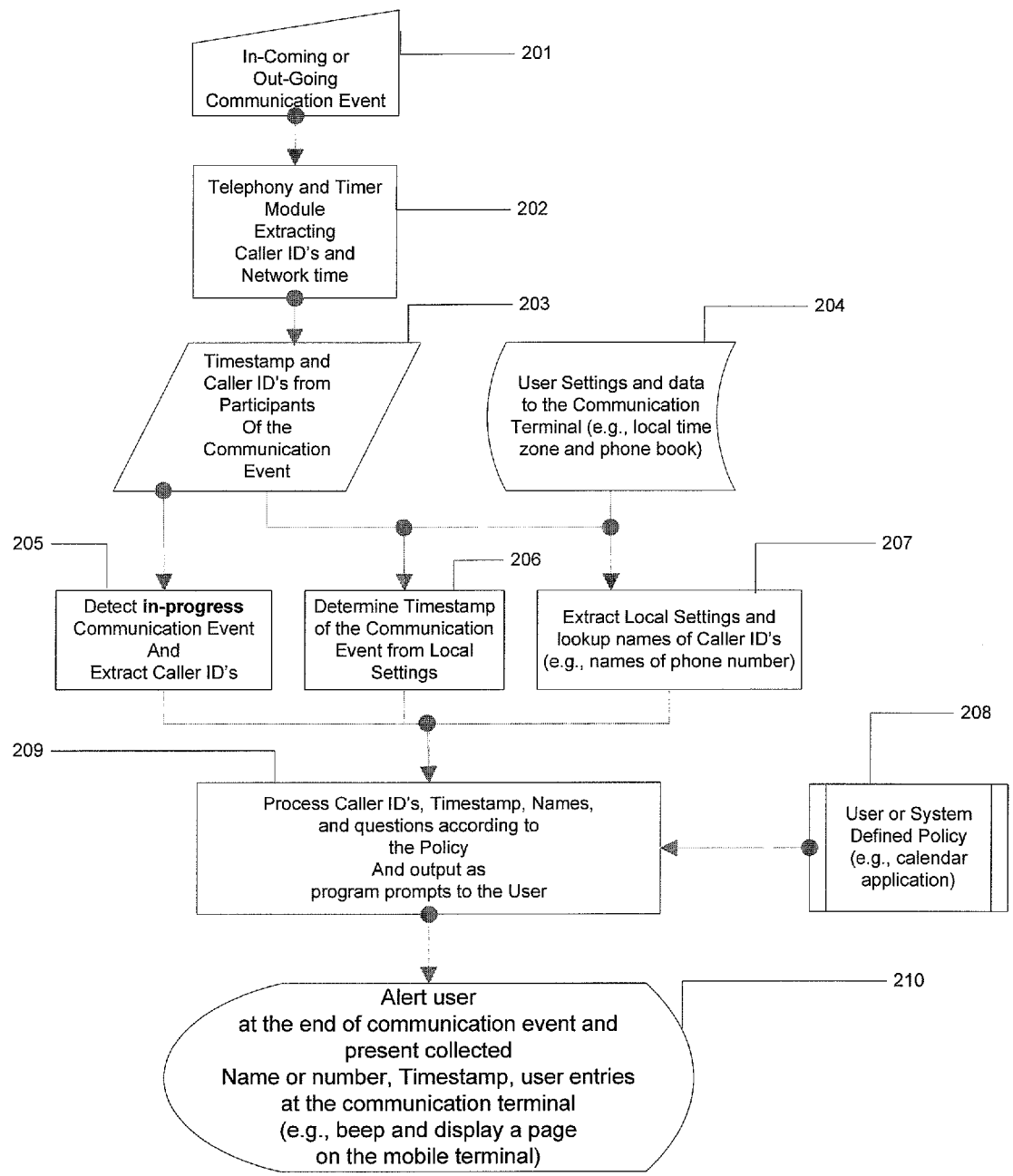
FIG. 2 is a data flow diagram showing the event-driven information assembly and preparation for user's annotation.

FIG. 2 shows a flow diagram of an embodiment of the invention where the terminal device integrates information from the communication network, user settings, and user policy available at the terminal device for target application and prompts user for additional annotation to the communication event.

The communication event between the user at a first terminal device and the other calling parties at secondary terminal devices is in one of the voice, textual, video, or other formats. The type of the communication event is in one of the incoming or outgoing directions. Upon a successful connection of the communicating parties, information related to the event is sent to a system which implements a preferred embodiment of the invention 201 on a terminal device.

From the commonly available telephony and timer modules which interface with the communication network from the first terminal device, only caller ID's, event status, and network calibrated time stamp are extracted 202. Generic formats of the caller ID's, event status, and time of the communication event are passed to various modules for further processing 203.

Related user settings and application data 204, which are available to the terminal device are fetched for processing related information extracted from the communication network.

In the preferred embodiment of the invention, caller ID's for an in-progress communication event is extracted in the format of phone number 205, for example, to be compared with the phone book directory to obtain a person's name if found 207. The time of the event is converted to local time 206 according to user setting for a calendar event 204 also.

Default or user's policy on targeted application 208 is obtained before the assembly of the user prompts for additional annotation or further selection 209. In the preferred embodiment of the invention, assembled user prompts for annotation and selection are combined with an audio alert which notifies the user on the readiness of the user prompts 210.

Figure 3:
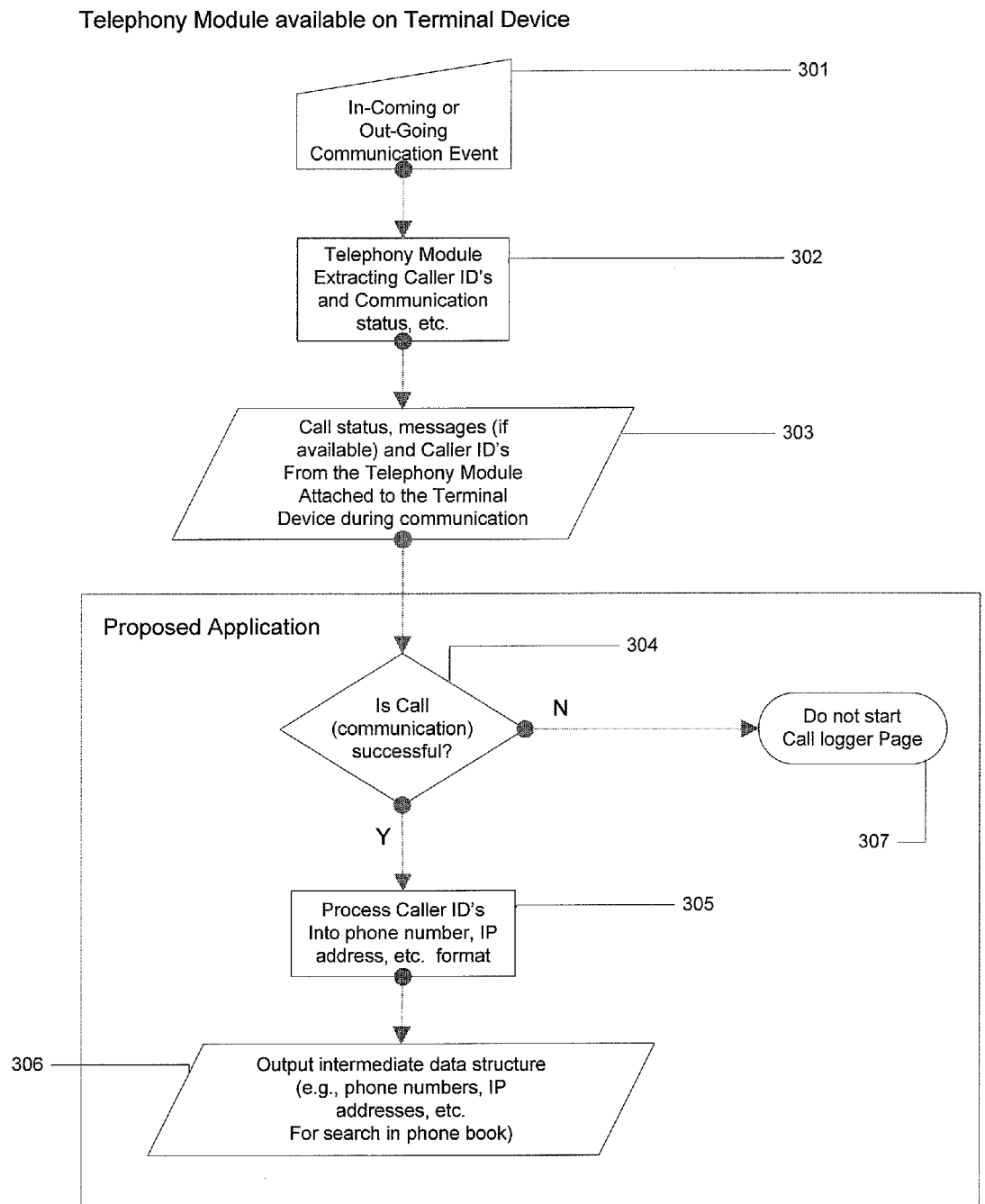
FIG. 3 shows an example of the invention of which an extraction module collects information of a communication event from a commonly available telephony module.

As shown in FIG. 3, the telephony module on a terminal device 302 extracts information including caller ID's and the status of the communication event 301 from the telecommunication network. Generic format of the caller ID's, textual message, and status notification 303 are made available to the extraction module, 103 of FIG. 1, from the common telephony module. The telephony information extraction module, 103 of FIG. 1, reads the generic telephony information 303, and checks the status of the communication event 304. If the communication is not established, there is no event-driven information annotation to the communication event 307. In the preferred embodiment of the invention, there is no call logger page for unsuccessful communication. In case the communication established successfully, one or plural caller ID's of other participating parties are converted 305 into preferred format such as phone numbers or Internet Protocol (IP) addresses 306 and passed to the information and policy processing module, 104 of FIG. 1.

Figure 4:
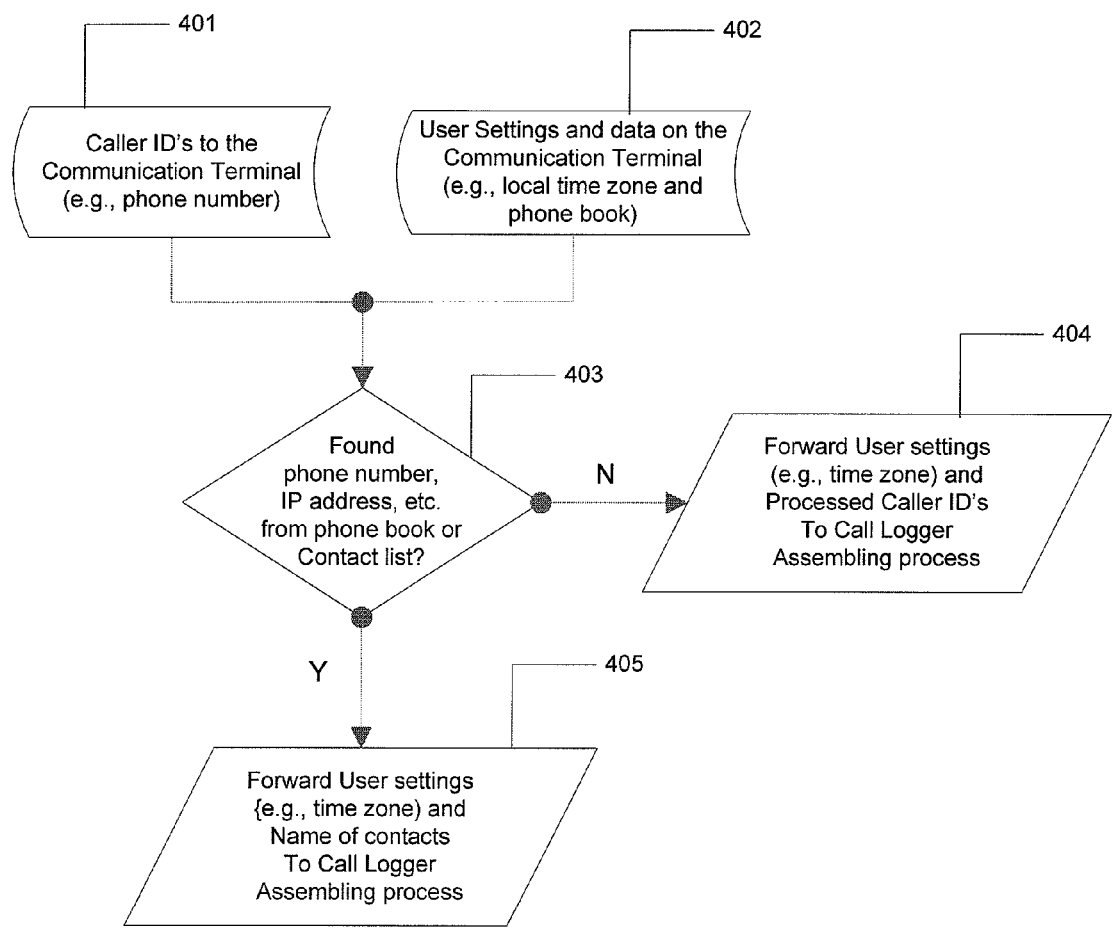
FIG. 4 is a data flow diagram showing user settings and extracted caller ID are processed according to local data available to the terminal device.

If there are related user settings and application data such as time zone and phone book available on the terminal device, FIG. 4 shows more specific information such as caller name and time zone can be extracted. The intermediate format of caller ID's 401 are compared 403 with a contact directory such as phone book 402 on the terminal device. If names are found with the intermediate format of caller ID's 401, the user settings (e.g., time zone) and caller names 405 are passed to the information and policy processing module, 104 of FIG. 1. Otherwise, the intermediate caller ID's are packaged with user settings 404 for event annotation.

Figure 11:
FIG. 11 shows an example of the user settings on the terminal device.

In an example illustrated in FIG. 11, the user can set local time zone 1101 from the terminal device under the options module 1102. The time zone setting is saved as on device data for applications such as calendar.

Figure 5:
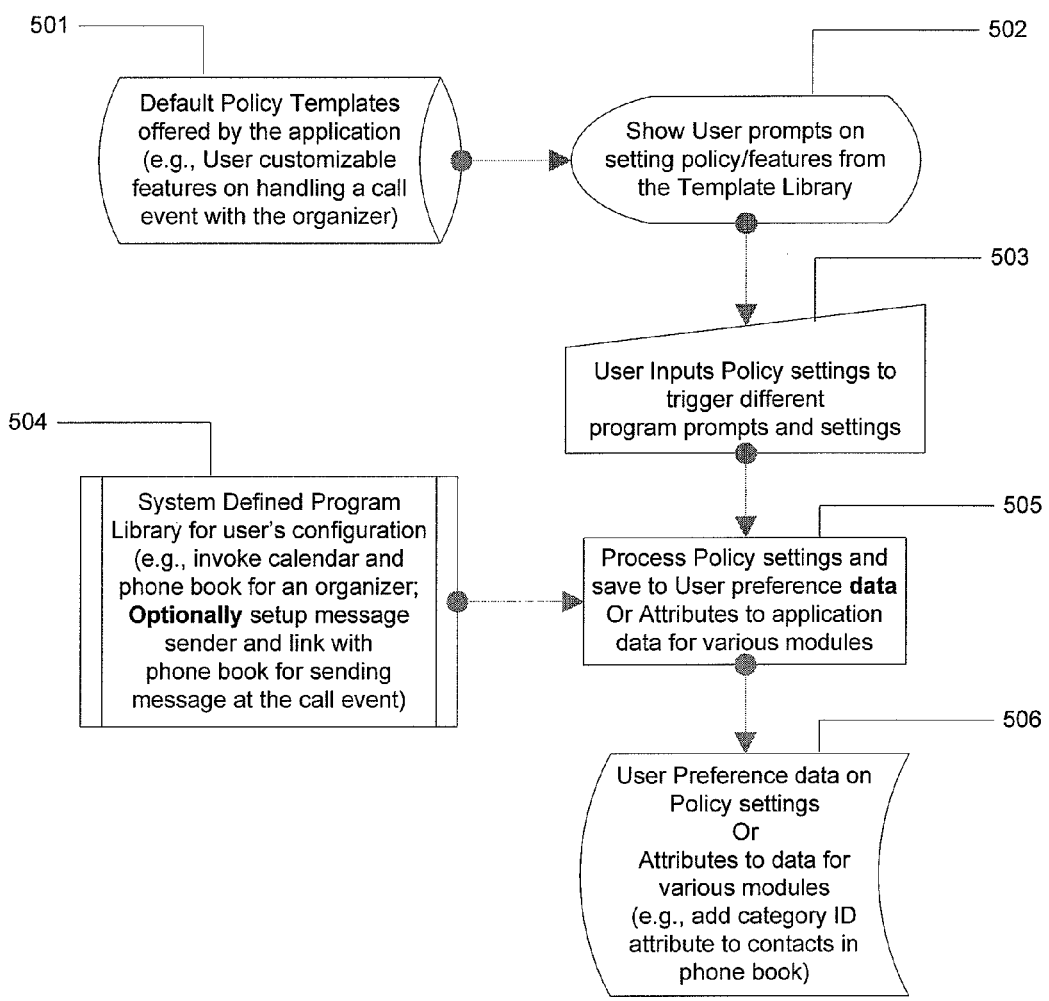
FIG. 5 is a flow diagram showing user can customize how the information annotation is saved with provided policy templates and program library on the terminal device.

In an embodiment of the invention illustrated in FIG. 5, there are pre-installed policy templates offered by applications available on the terminal device 501 and pre-defined program library configurable by the user 504. User is prompted on selecting or setting policy and features from the template library 502. For example, if the terminal device is equipped with calendar, phone book, and message sender, one of the user templates can include adding follow up events 121 while saving the call event and forwarding annotated communication events to a specific contact 122 for an elite caller 123 as shown in FIG. 12.

In FIG. 5, when the user selects policy settings 503, some of the program modules 504 are enables or disabled. Optional data attributes may be used to identify, for example, the elite clients. After processing the user preference on the policy 505, such settings may be stored 506 on a storage medium 108 available to the terminal device for the information and policy processing module 104 in FIG. 1.

Figure 12:
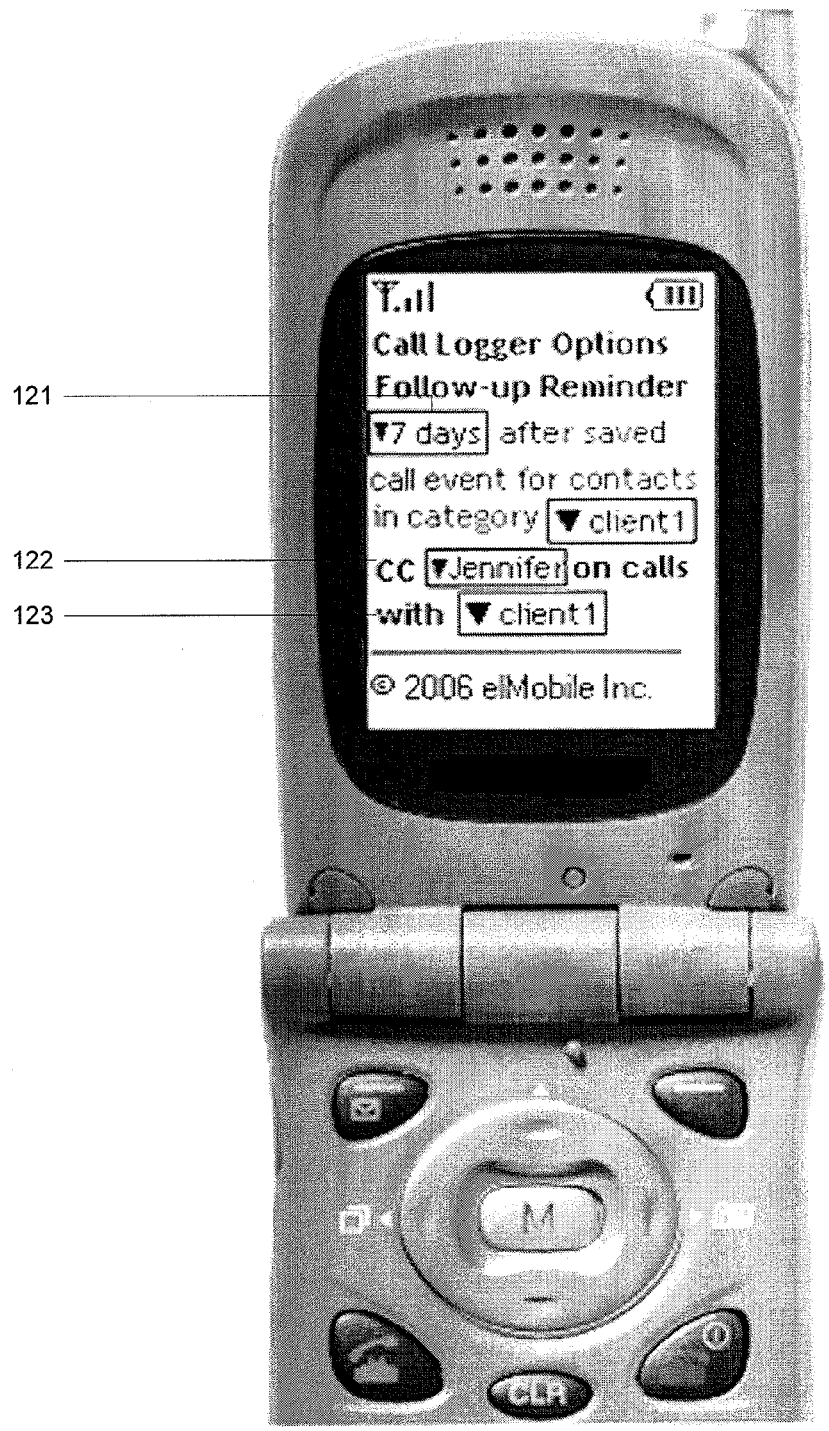
FIG. 12 shows an example of the user policy selection on the terminal device.
Figure 13:
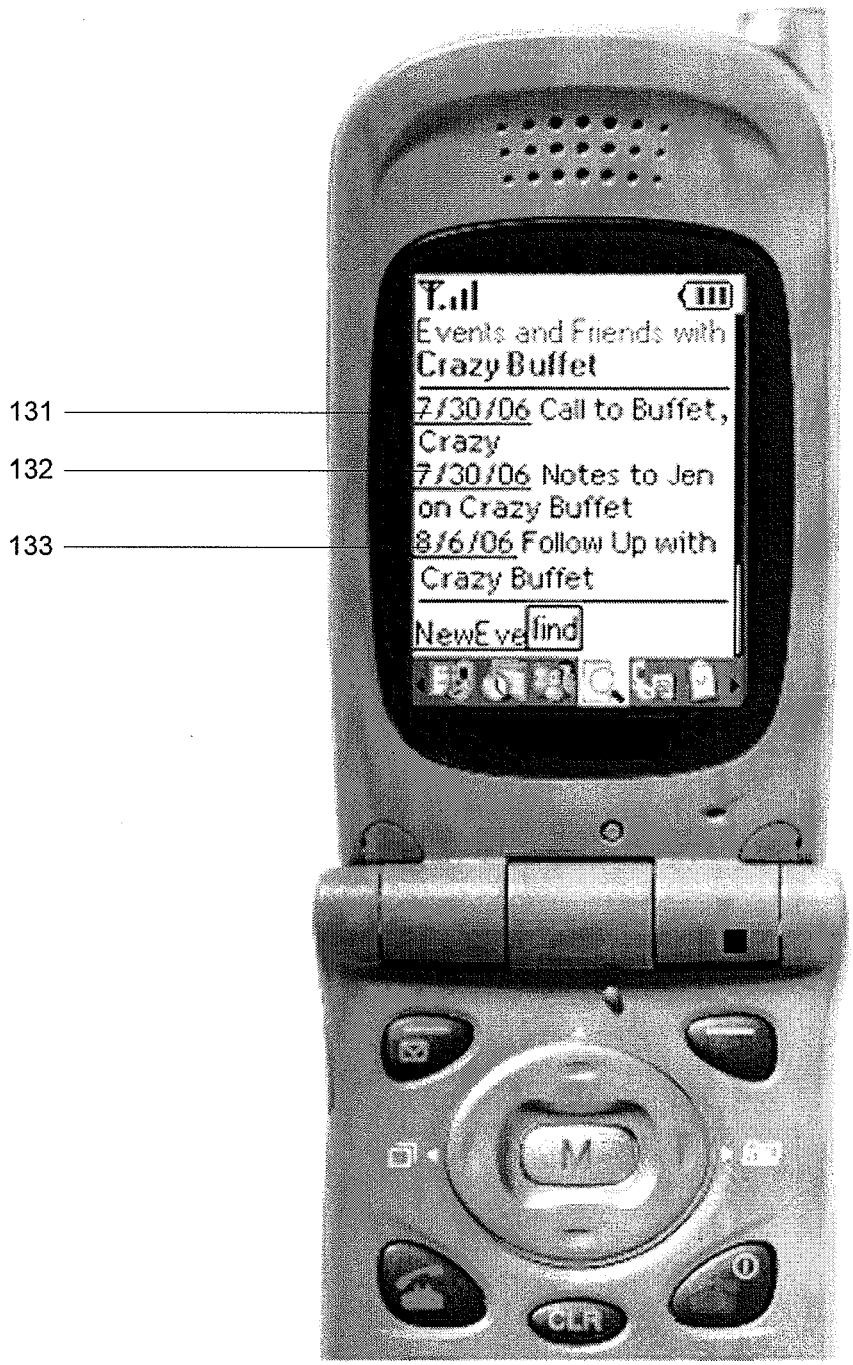
FIG. 13 illustrates the saved application entries related to the communication event according to the user policy in FIG. 12.

FIG. 13 demonstrates a result from a user defined policy in FIG. 12. The original call event 131 is saved along with a message to a contact 132 and a new task scheduled as a follow up to this call 133.

Figure 6:
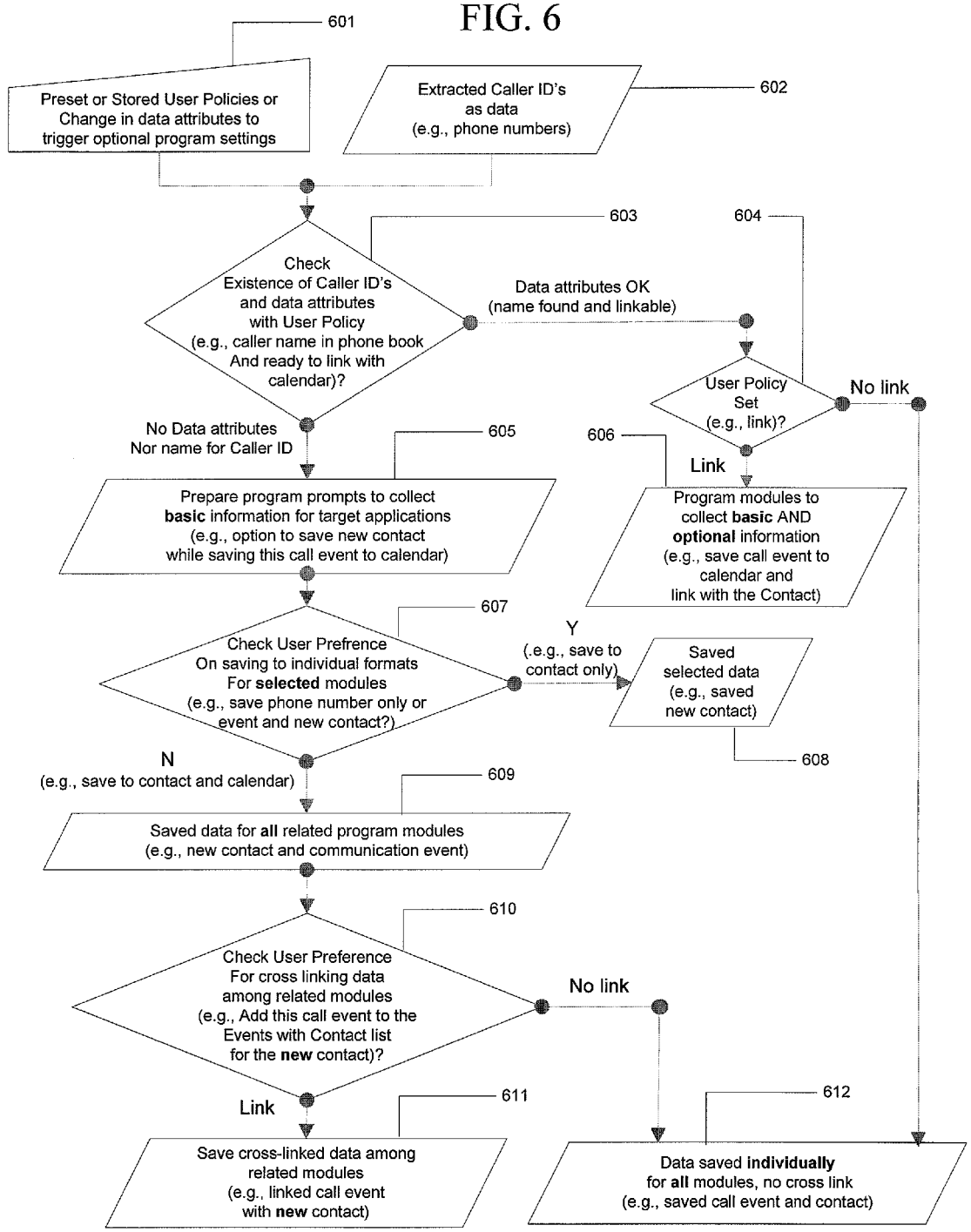
FIG. 6 is a flow diagram showing how the pre-determined user policy is used for saving and linking the annotated communication event into various application data formats.

An embodiment of the invention on processing the pre-set or stored user policy is illustrated in FIG. 6. The user policy can be determined explicitly by the stored user's preference or implicitly by the existence of data attributes for related applications 601. The extracted and processed caller ID's from an in-progress communication event is evaluated under the user policy for generating prompts to the user for efficient annotation 602. In the preferred embodiment of the invention, a caller ID in the format of a phone number is compared with a phone directory 603. If a name is found from the directory and the record has sufficient information such as unique index for linking to items in the calendar, the saved call event will be linked to records in the phone directory 606 if the user's policy setting 604 is to cross link records among application modules. Otherwise, the call event is saved as stand alone calendar entry 612.

Figure 14A:
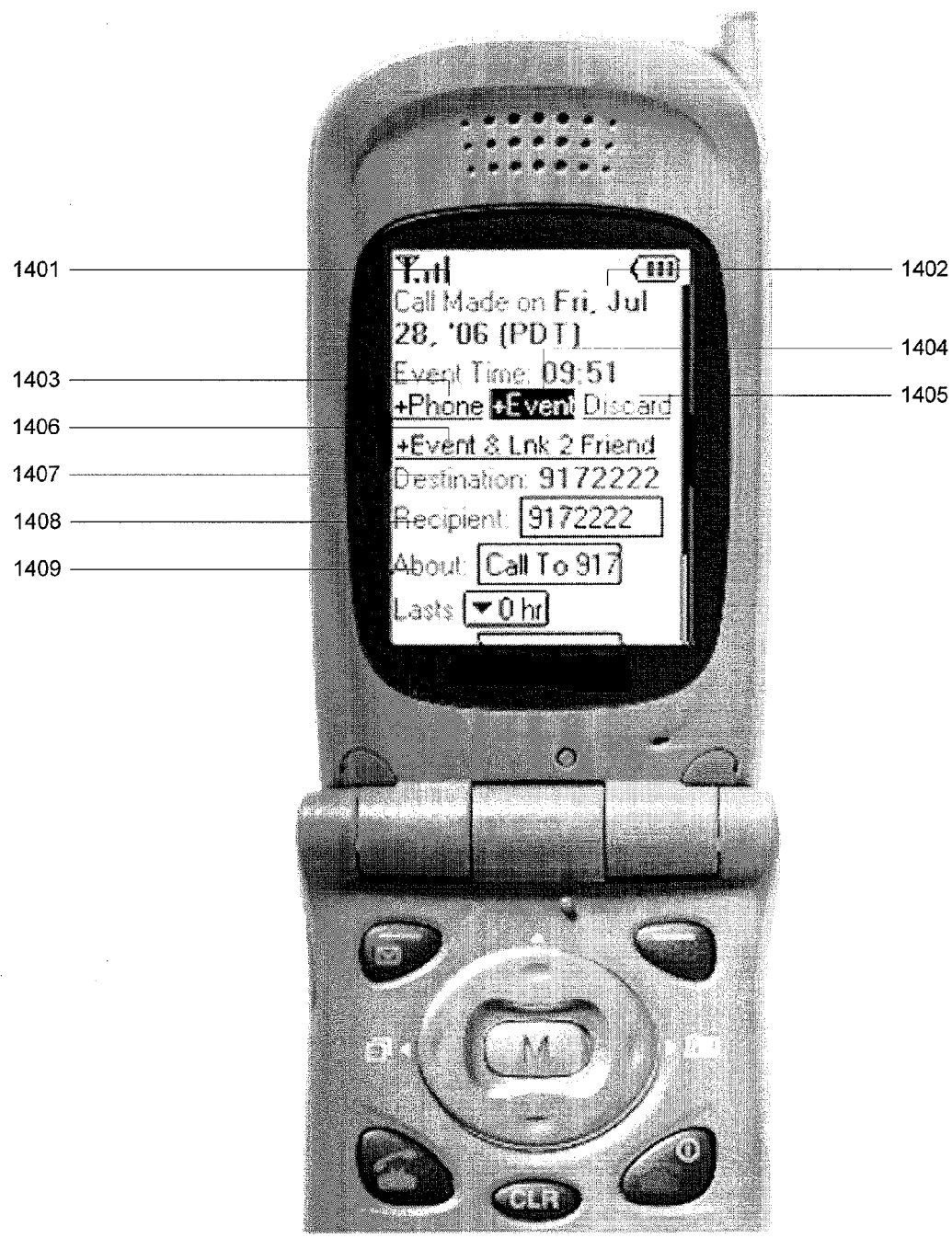
FIG. 14A and FIG. 14B illustrate different call logger pages generated by the user policy from FIG. 7 and FIG. 6.
Figure 14B:
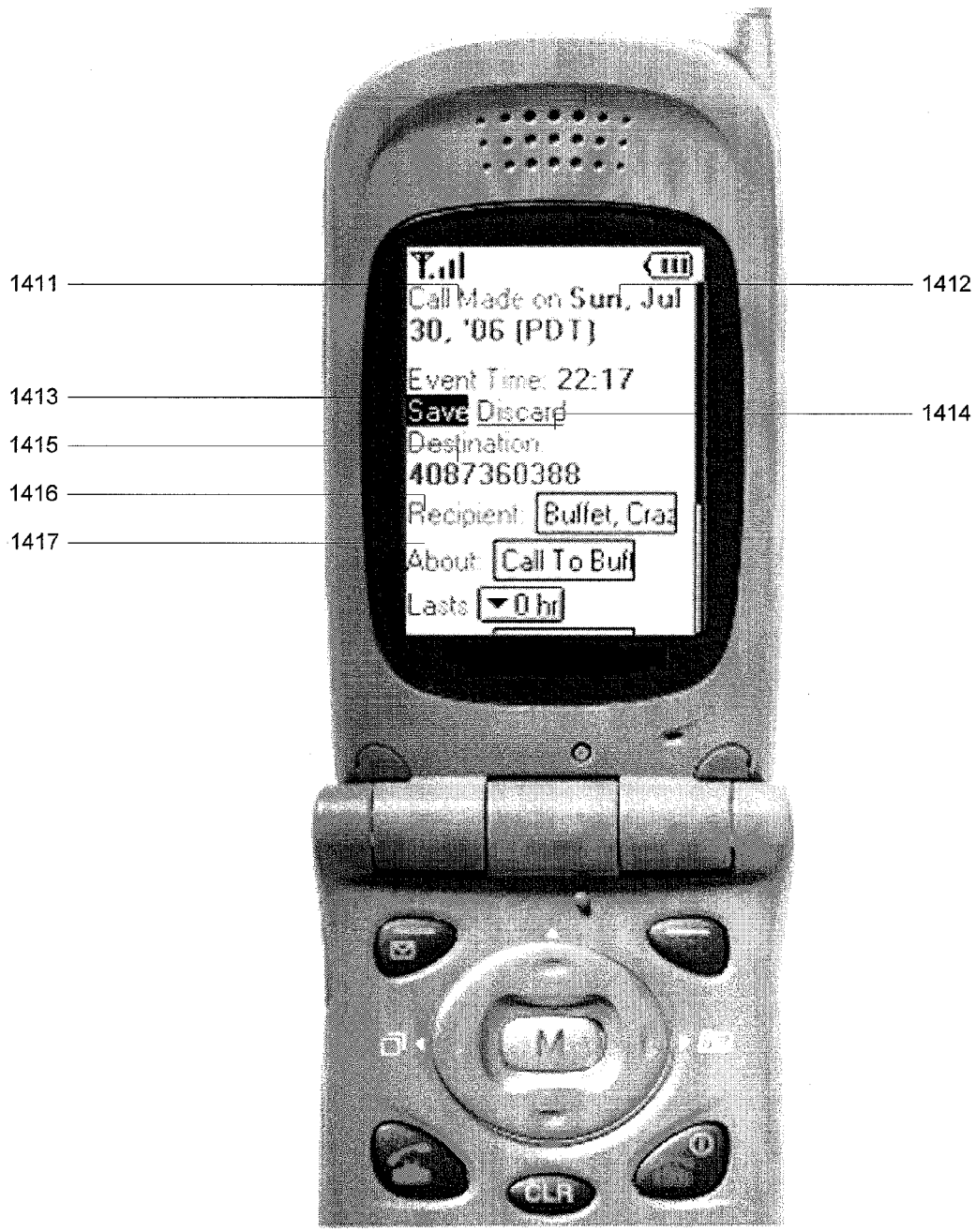

An example of policy driven user prompts is shown in FIG. 14B. At the end of the communication event, a call logger page is displayed along with alert sound. The call logger page reports type of the call as outgoing 1411, time of the call adjusted to local time zone 1412, caller ID 1415 and corresponding name found in the phone directory 1416. There are entry boxes for user to annotate more information to the event 1417 and command links to save 1413 or discard 1414 the call event. The save and link contact to a call event is implemented as a system policy once user selects to save the call event 1413.

Figure 15A:
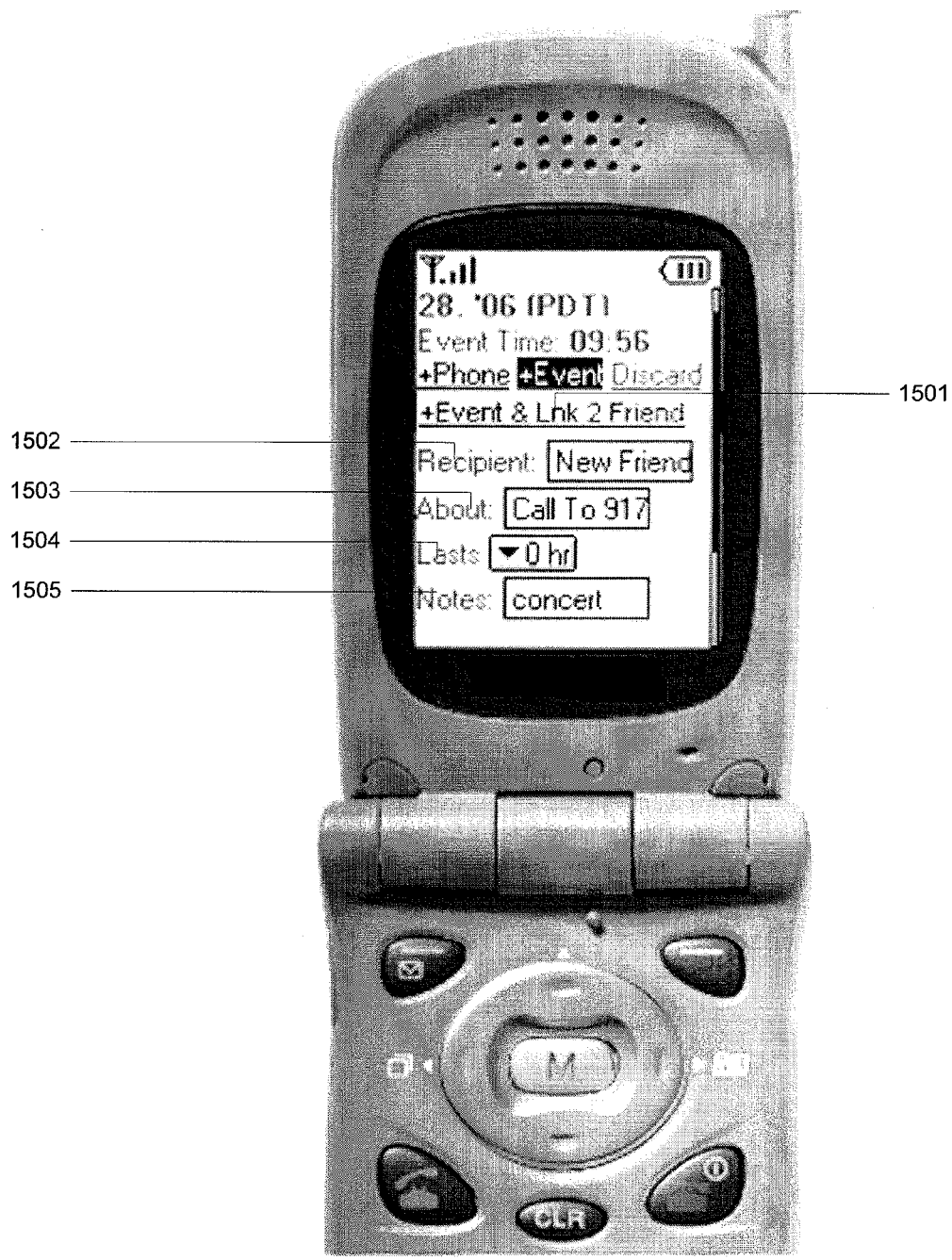
FIG. 15A and FIG. 15B show user annotates the communication event on different call logger pages generated by the user policy from FIG. 7 and FIG. 6.
Figure 15B:
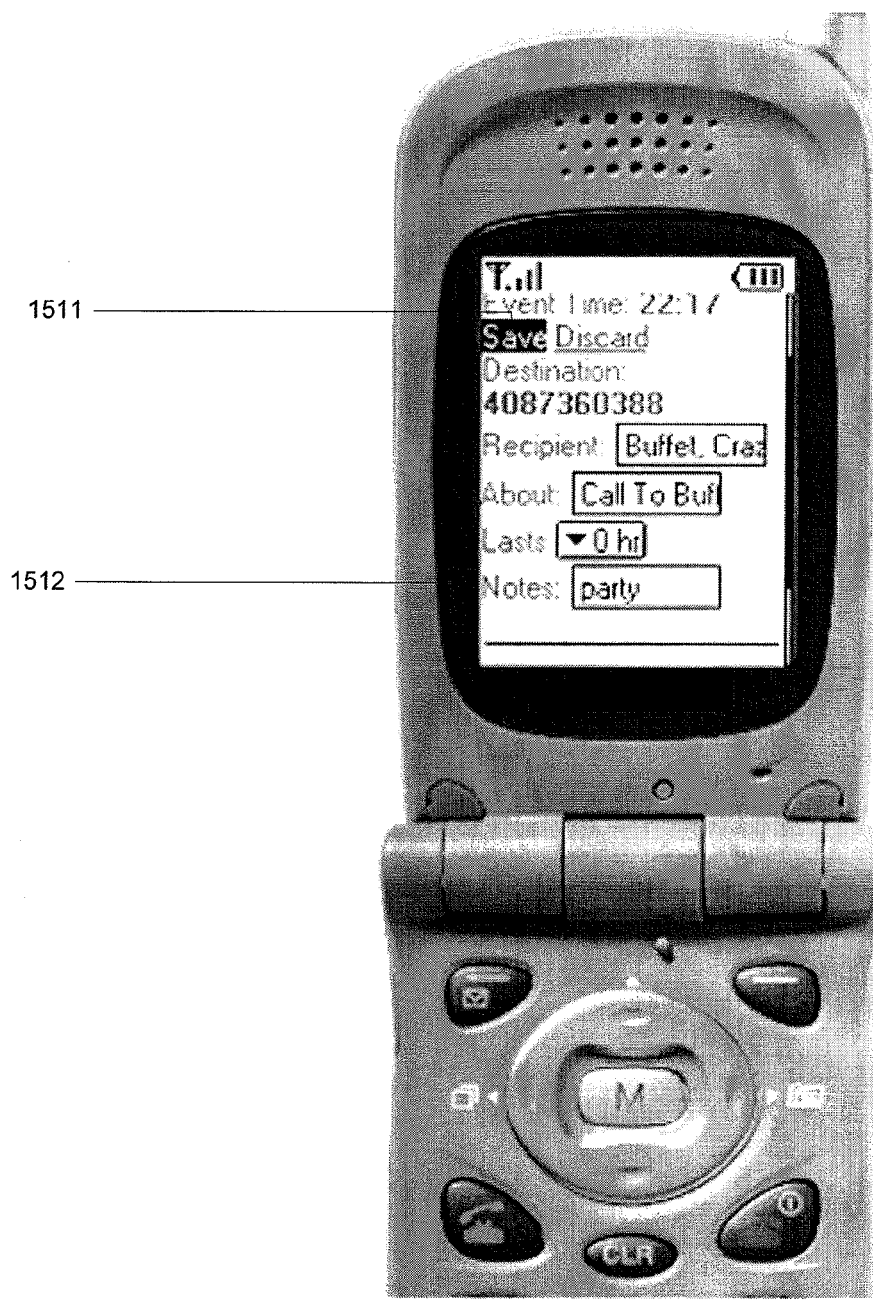
Figure 16A:
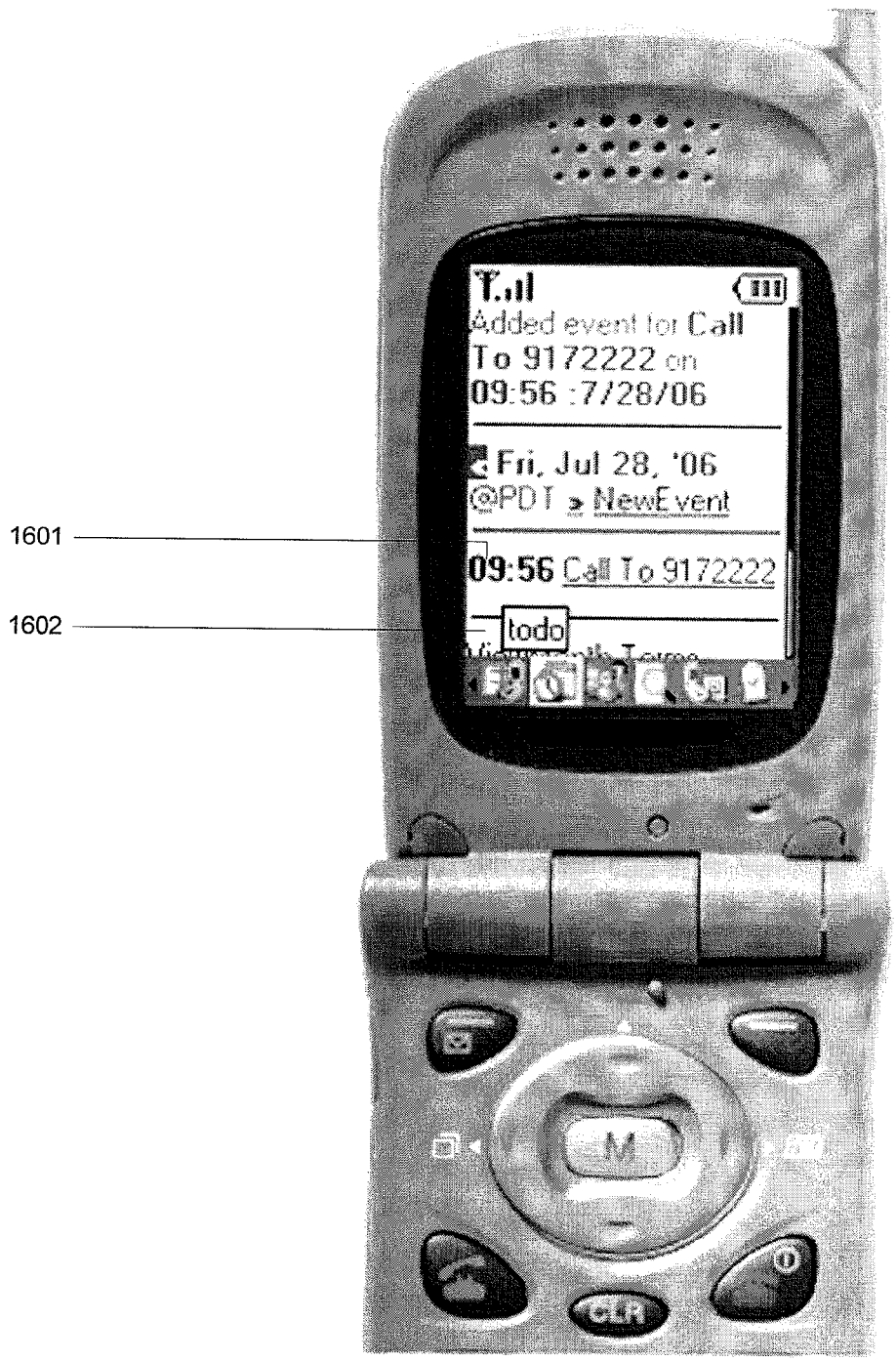
FIG. 16A and FIG. 16B illustrate the saved communication event from FIG. 15A and FIG. 15B separately.
Figure 16B:
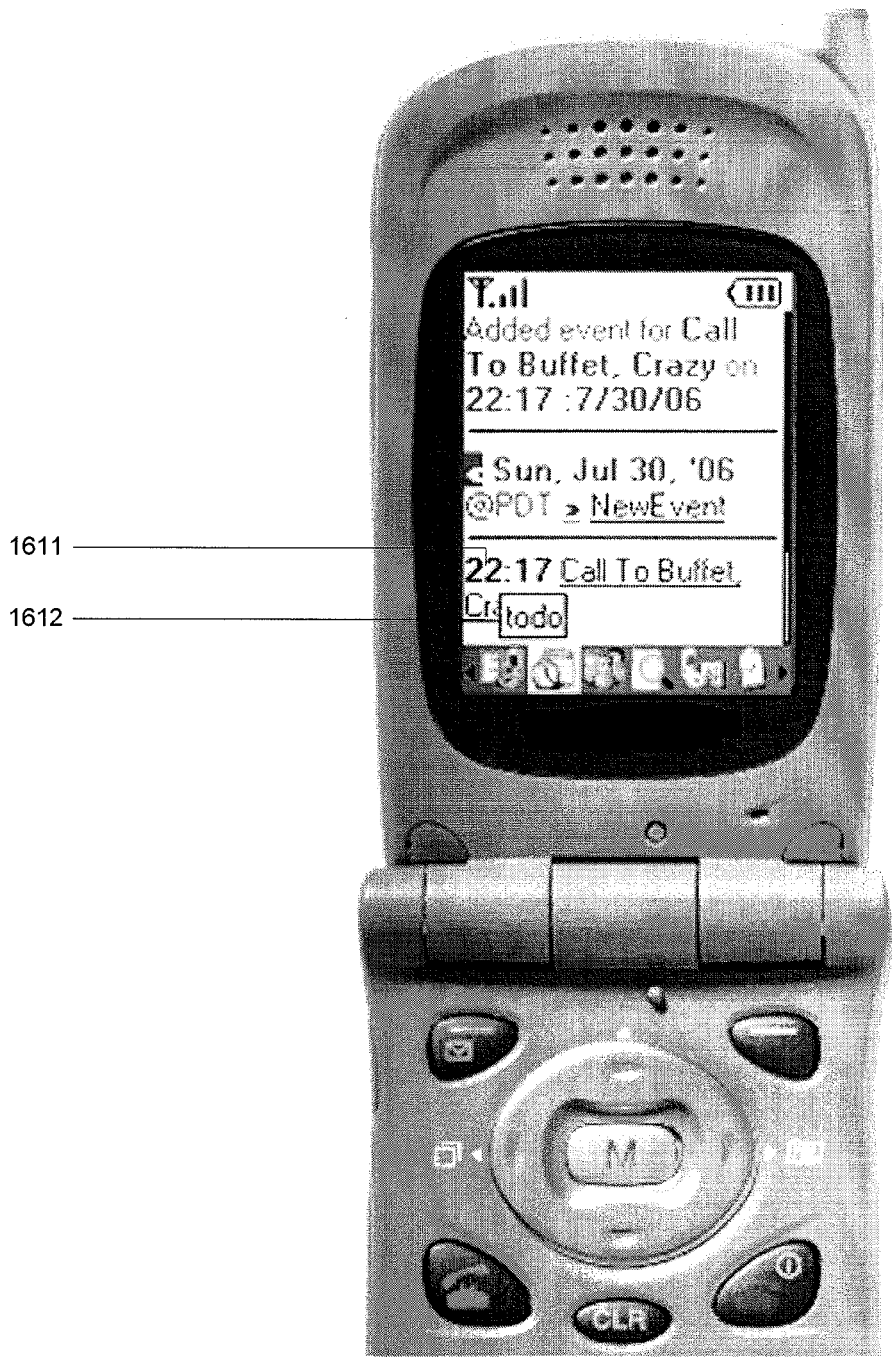
Figure 18B:
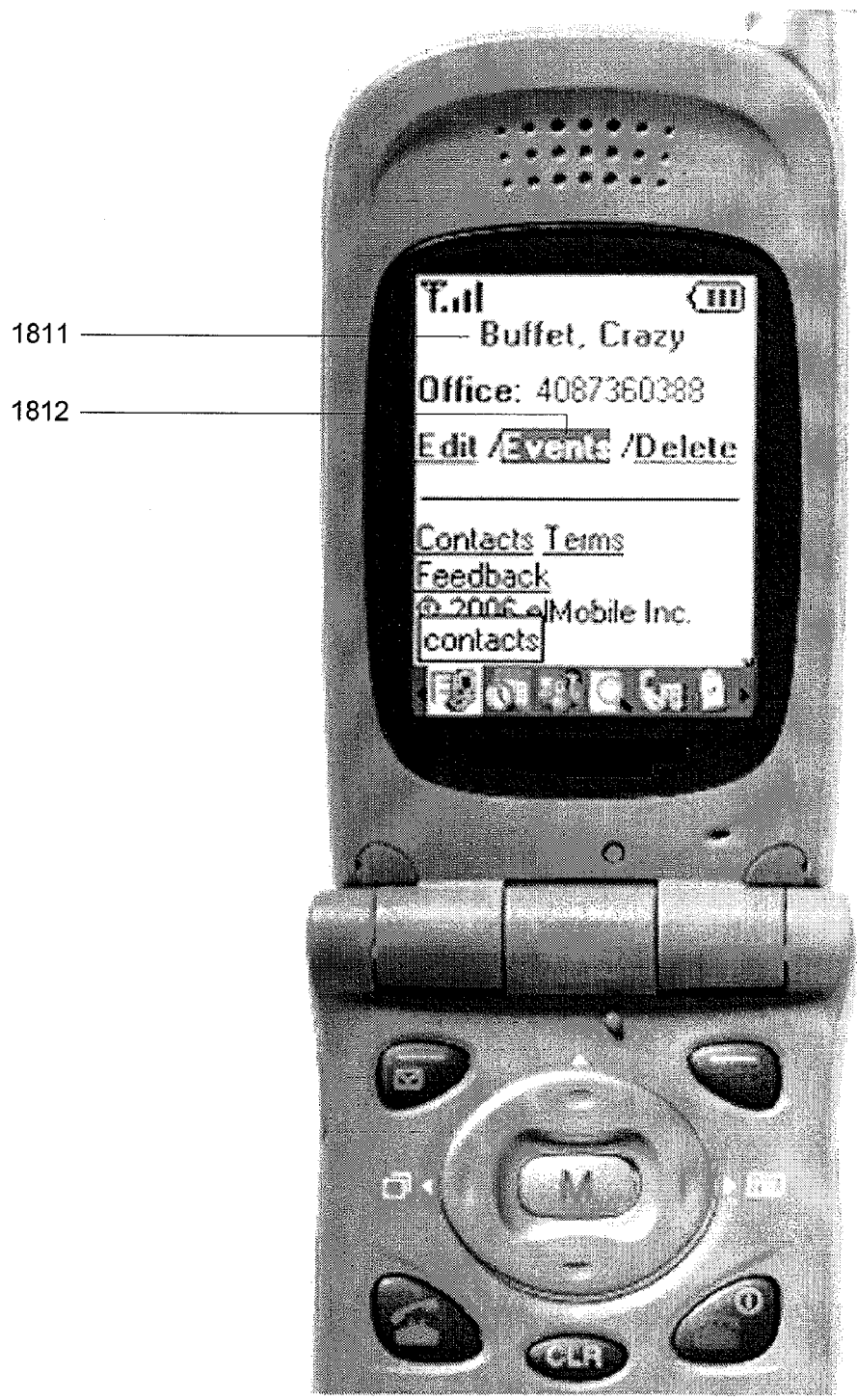
Figure 19A:
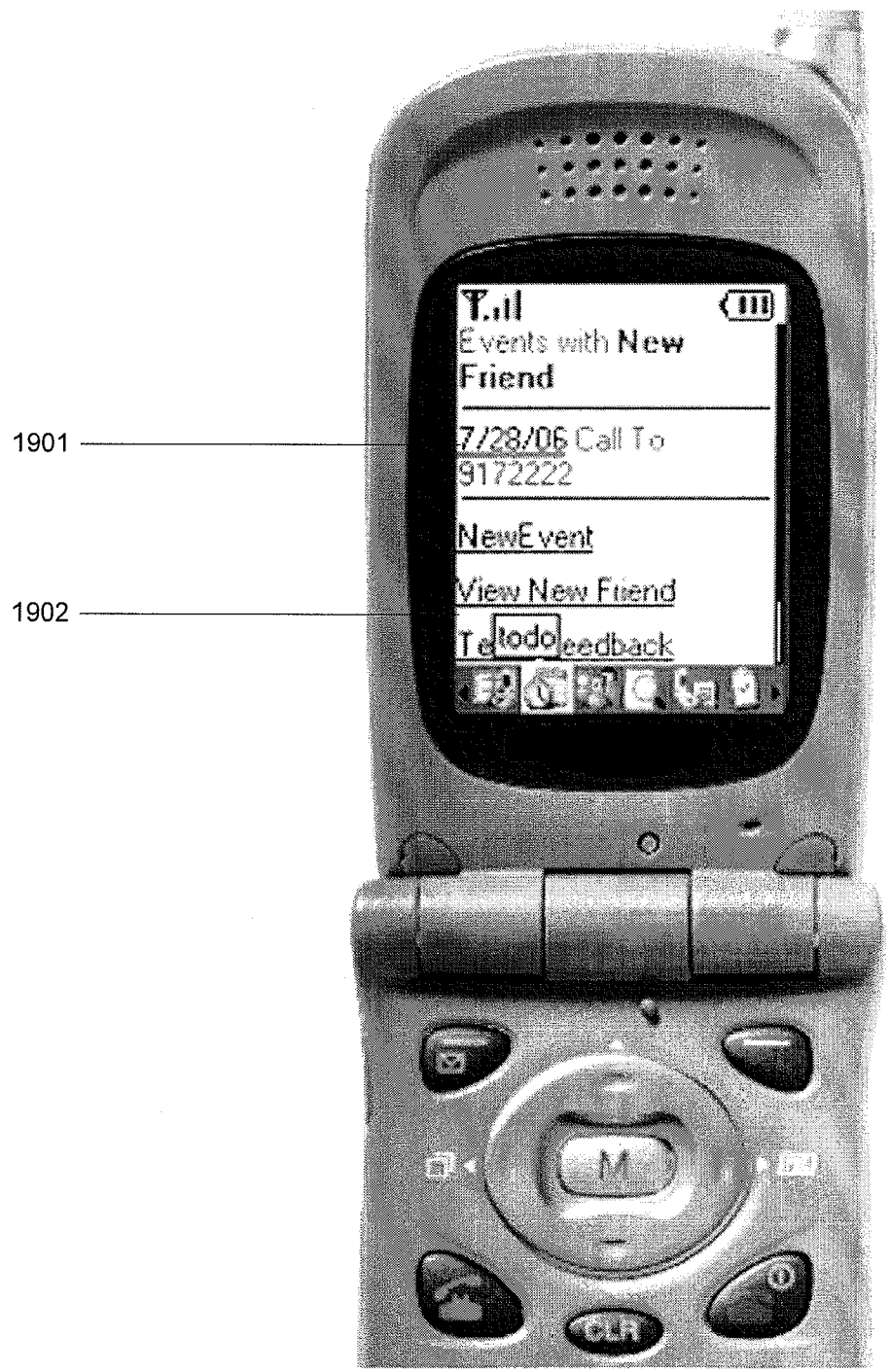
FIG. 19A and FIG. 19B illustrate different events are saved and linked according to different user policy from FIG. 7 and FIG. 6.
Figure 19B:

Following the example in FIG. 14B, the user annotates more information 1512 to the call logger page in FIG. 15B and saves the event to a calendar 1511. FIG. 16B shows the call event with annotation is saved to corresponding local date and time 1611 in the calendar application 1612. The cross linked call event for a more complex user policy in FIG. 13 can be verified in FIG. 18B from the contact record 1811 page with pointers to linked events 1812. FIG. 19B demonstrates the cross-linked call event 1911, a message to related contact 1912, and a follow up reminder 1913.

In FIG. 6, if the caller ID cannot be found in the phone directory and the data attributes are not available, the application prepares different prompts for user to collect basic information separately 605. Additional user preference is checked 607, if available, on saving the user annotation to various application data. User can designate specific modules like the phone directory only for saving the user annotation related to the call event 608 (e.g., save a new name with a new caller ID only). In the preferred embodiment of the invention, all user annotations are saved along with the call event into related application data 609. User preference on whether to link the saved application data, if available, is examined 610 before saving the annotation to separate application formats with all possible cross linking 611 among records related to the call event, or no cross link 612.

Figure 7:
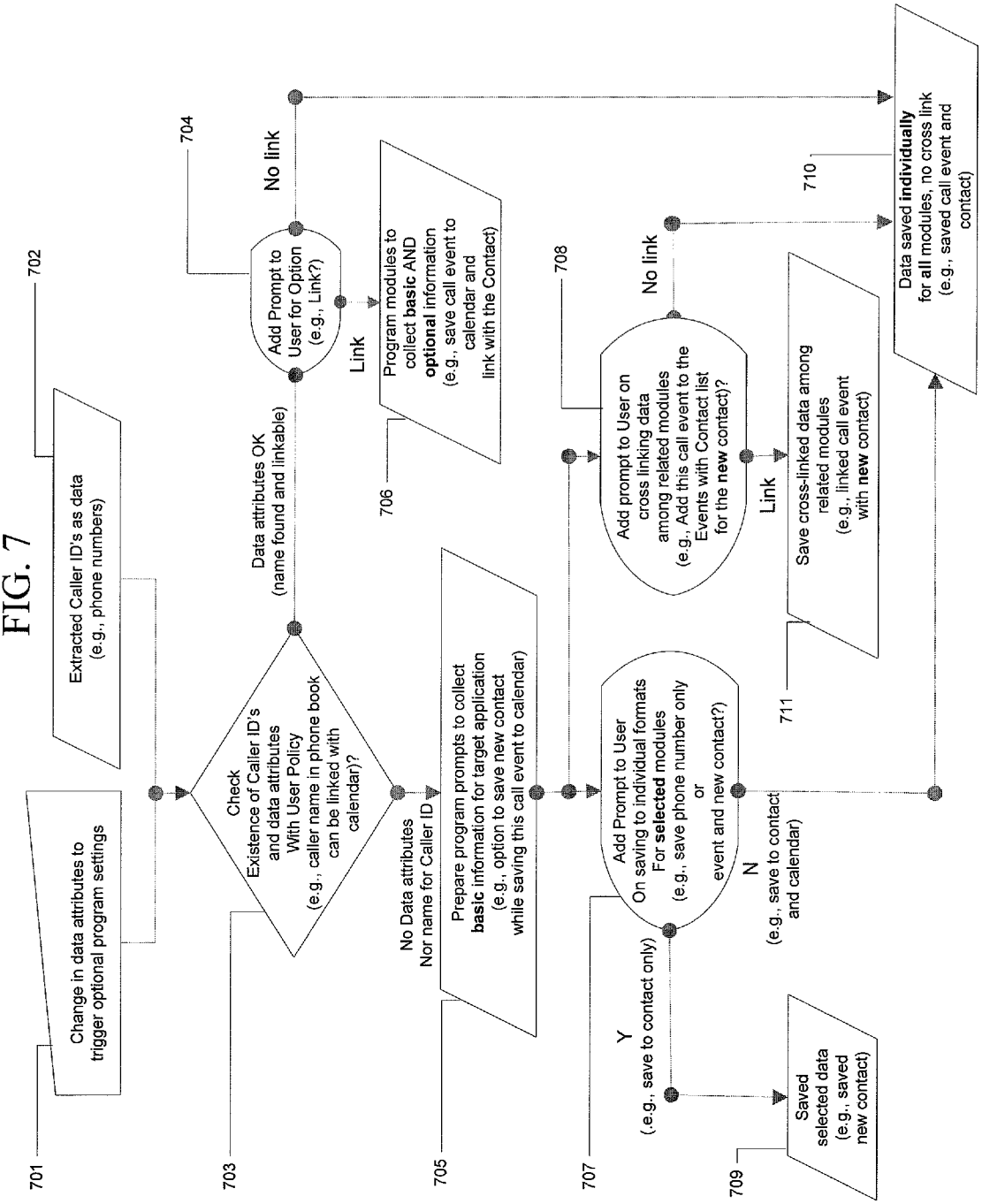
FIG. 7 illustrated an interactive method for user to determine the application data saving and linking policy at the end of the communication event.

Another embodiment of the invention is illustrated in FIG. 7 where the user policy setting process is interactive. In this case, the target application such as organizer checks 703 the extracted and processed caller ID's 702 (e.g., phone number) with application data 701 (e.g., names and unique record index) for cross application linking (e.g., links to calendar). If the caller name and application data attributes are found for a given caller ID, the user is prompted 704 to link saved call event with the contact 706 or just save the annotated event to separate application formats 710.

In FIG. 7, if the caller ID cannot be found in the phone directory, the application prepares various prompts 705 for user to save annotation to selected application modules only 707 or save annotation with cross link among application data 708. In the preferred embodiment of the invention, the user can answer the prompt 707 to save annotation for a selected application 709 or for all related applications separately 710. Alternatively, the user can answer the prompt 708 to link saved user annotations among related applications 711 or no cross link among saved application data 710.

An example of the interactive user policy setting is show in FIG. 14A. At the end of the communication event, a call logger page is displayed along with alert sound. The call logger page reports type of the call as outgoing 1401, time of the call adjusted to local time zone 1402, caller ID 1407 and temporary name for the phone directory 1408. There are entry boxes for user to annotate more information to the event 1409 and command links to save the new number only 1403, save the annotated call event only 1404, save both new contact and link with annotate call event 1406, or discard 1405 the call event.

Figure 17:
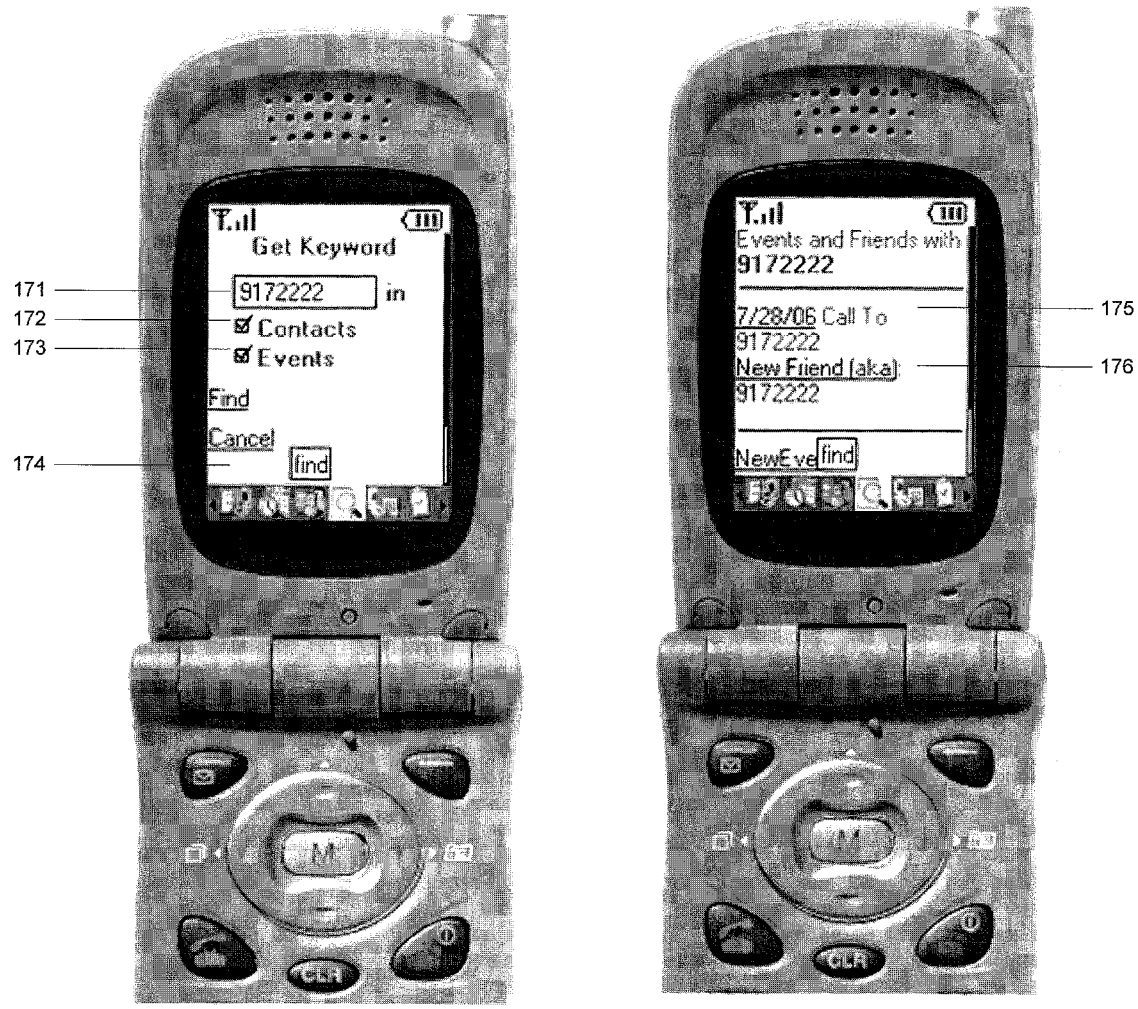
FIG. 17 is an example showing how user can verify the saved communication event and contact name annotation using a search application on the terminal device.

Following the example in FIG. 14A, the user annotates more information 1502, 1503, 1504, 1505 to the call logger page in FIG. 15A and saves with cross links between both the new contact and the call event 1501. FIG. 16A shows the call event with annotation is saved to corresponding local date and time 1601 in the calendar application 1602. As shown in FIG. 17, user can perform record search 171 both in the contact directory 172 and event calendar 173 with the find application 174 to verify the saved new contact and call event. The search returns both the call event 175 and the new contact 176 found on the storage available on the terminal device.

Figure 18A:
FIG. 18A and FIG. 18B illustrate linked events to a contact is accessible from the contact directory application.

The cross linked call event can be verified in FIG. 18A from the contact record page 1801, 1805 with newly added phone number 1802, assigned contact name 1803, and pointers to linked events 1804. FIG. 19A demonstrates the cross-linked call event 1901 in the calendar application 1902.

Figure 8:
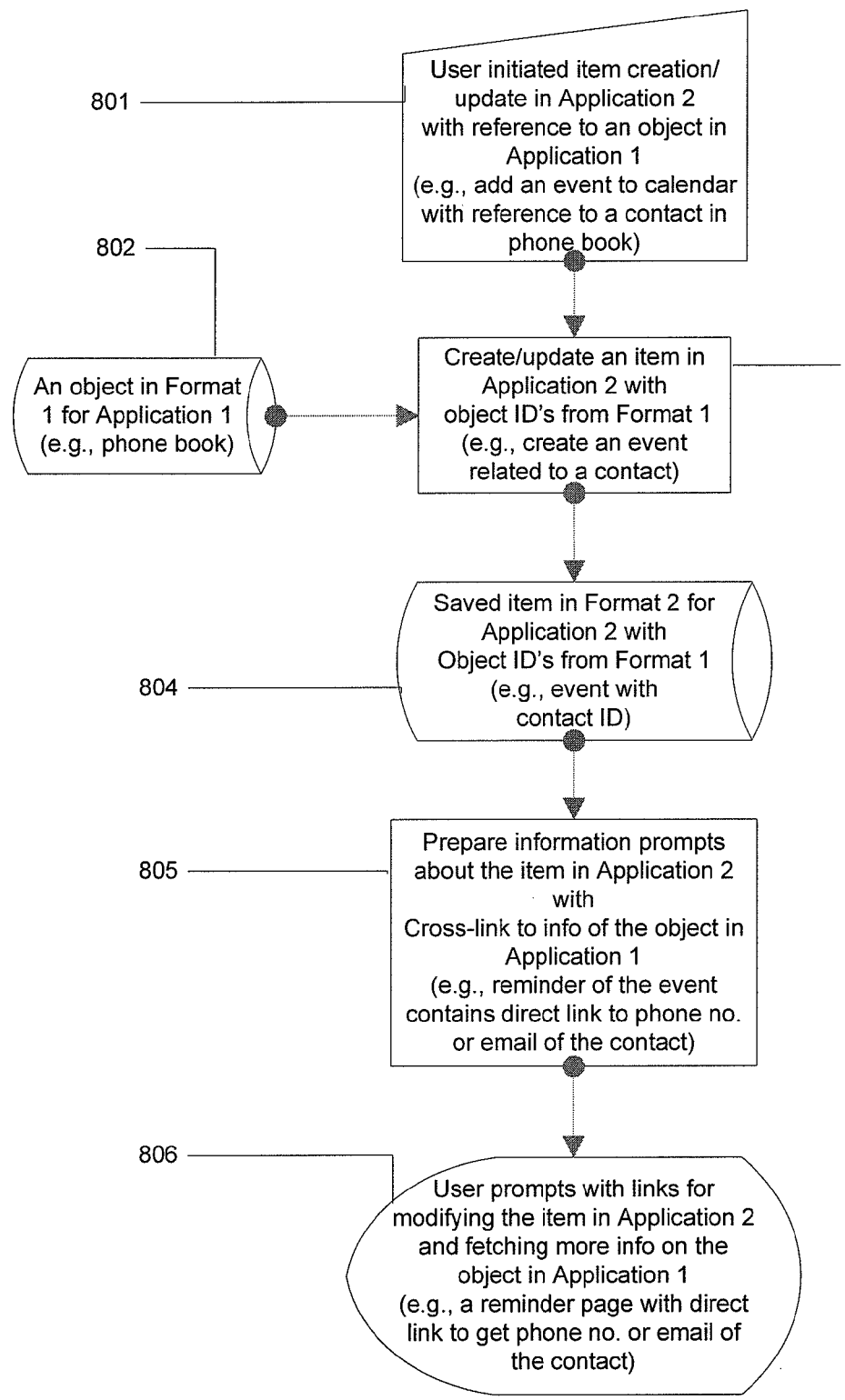
FIG. 8 shows an example of the invention of which cross link of annotated data is carried out for two application modules.

An embodiment of the invention on cross linking data from various application modules is illustrated in FIG. 8. The user or policy setting demands a creation of an item in application 2 with reference to a record in application 1 801 on a system available at the terminal device. The system fetches the object index from application 1 802 as a data flag for application 2 and assembles with input information 801 for application 2 803. The new item for application 2 is saved with reference to the object index or pointer to the record in application 1 804. After the new item is saved for application 2, the system prepares user prompts 805 with summary of the item in application 2 and a link or pointer to the related record in application 1 806 for confirmation.

Figure 20:
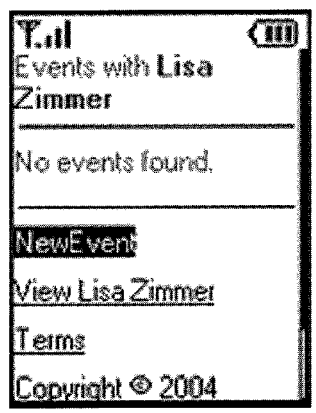
FIG. 20 shows an example of cross linked contact record accessible from the calendar application.
Figure 20:
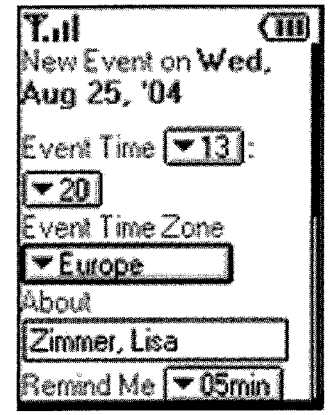
Figure 20:
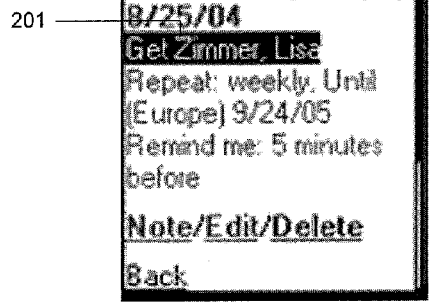
Figure 20:
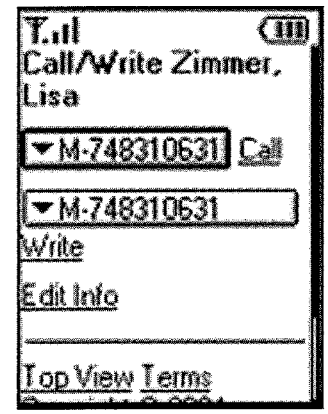

An example of cross linked event is shown in FIG. 20. The user creates an event FIG. 20(2) from a record in the contact directory in FIG. 20(1). The system saves the new event with cross link to the contact 201 and displays a summary page with a link to phone numbers or email addresses of the contact as shown in FIG. 20(3). When user selects the link to the contact, the contact's phone number and email address are displayed for easy access as shown in FIG. 20(4).

Figure 9:
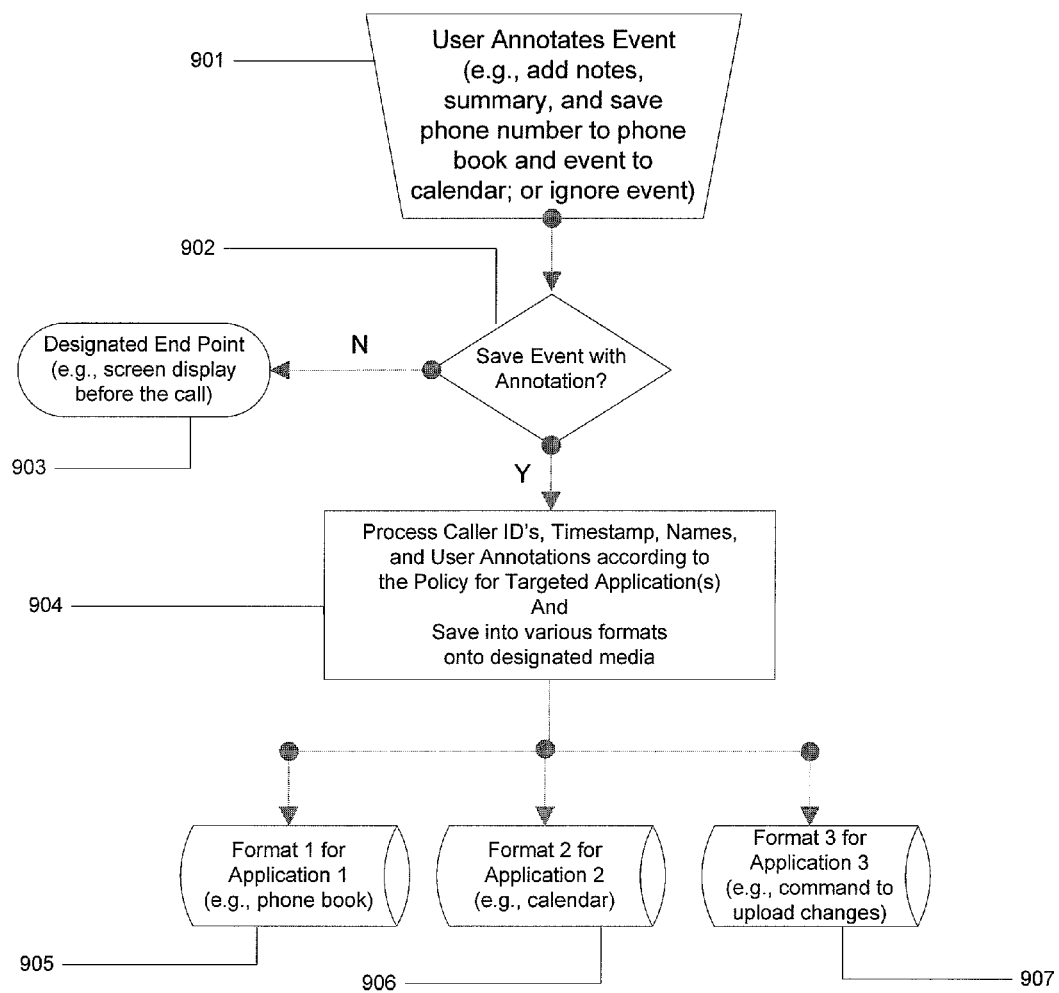
FIG. 9 is a flow diagram showing assembled user annotation and communication event data are saved into various formats for different applications.

In the preferred embodiment of the invention, a data flow diagram of saving the annotated communication event following the default or user policy is illustrated in FIG. 9. The assembled user annotation 901 to the communication event is checked on whether the policy demands saving to storage device for various application modules 902. If the annotated communication event is not saved, the system will go to designated end point 903 such as returning to screen display before the call. If the policy dictates saving the annotated communication event, a post processing is performed 904 to generate individual data for various applications 905, 906, 907.

Figure 10:
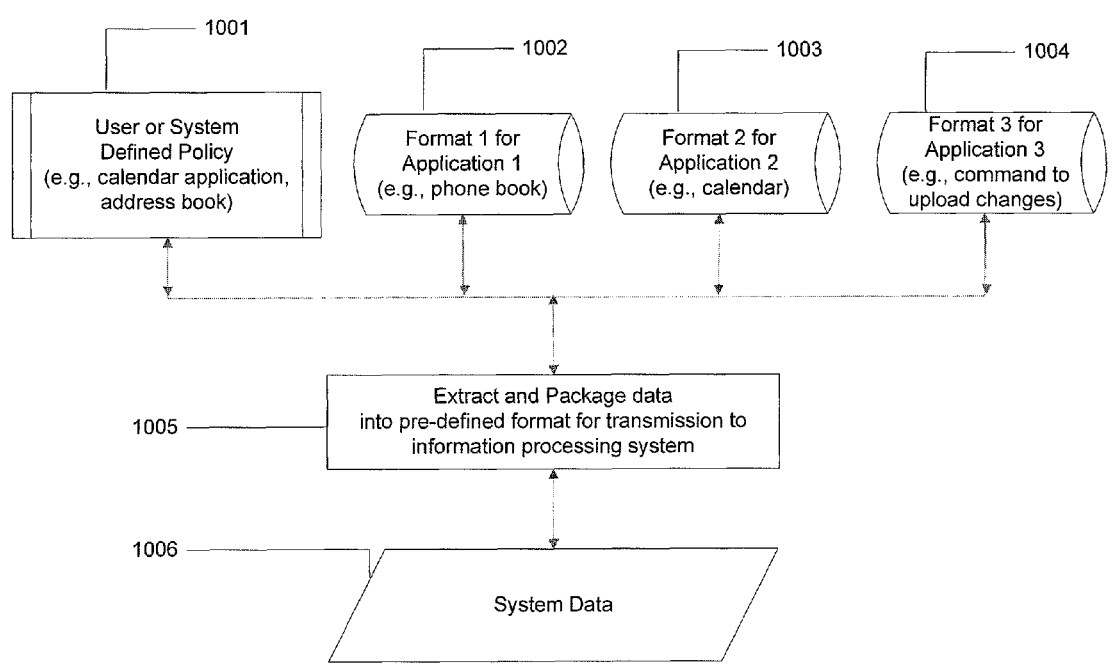
FIG. 10 illustrated an example of retrieving and depositing saved communication event with annotation.
Figure 21:
FIG. 21 shows an example of uploading saved communication events to a remote computer or system.

An example on utilizing the saved communication events with annotation is illustrated in FIG. 10. Saved application data 1002, 1003, and 1004 can be extracted and reformatted 1005 following the policy 1001 for transmitting to other application or system 1006. Other application or system can also deposit application data 1002, 1003, 1004 and updates the user policy 1001 through the data extraction module 1005 on the terminal device. FIG. 21 shows a data upload policy is executed on saved communication events 211 to a remote computer system. A report page is displayed on the status of the transmission 212.

Figure 22:
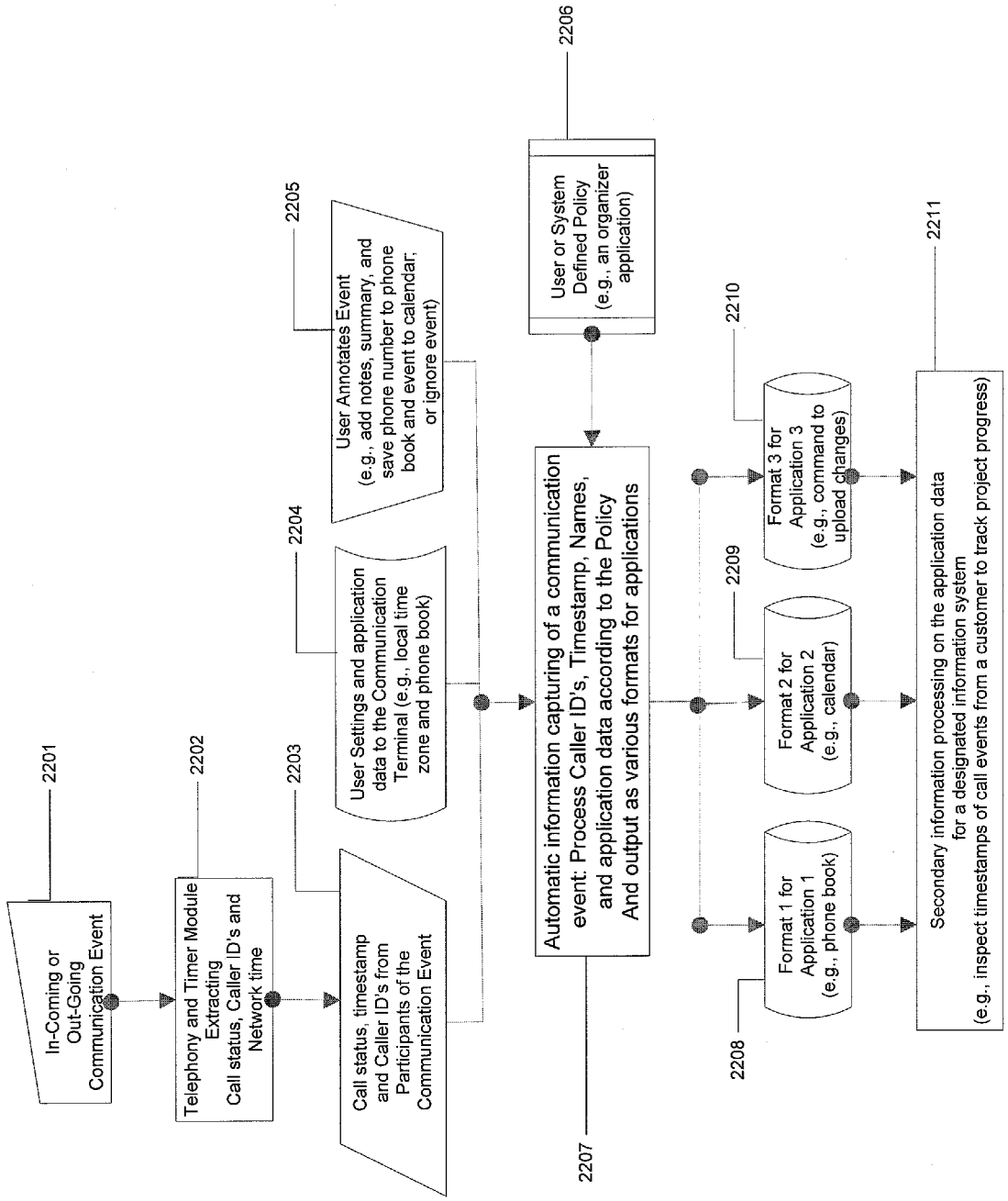
FIG. 22 shows a flow diagram of a sample system encapsulating a computer program implementing the invention.

An example of a computer system encapsulating the preferred embodiment of the invention is illustrated in FIG. 22. The system detects a communication event 2201 and extracts the status, caller ID's, and time of the communication event 2202. Extracted call status, caller ID's, and timestamp of the communication event 2203 are fed into a computer program implementing the invention 2207 with details shown in FIG.

1. Application data and settings from the user 2204 along with user annotation to the communication event 2205 (e.g., add notes and flag progress of related project) are available to the computer program 2207 also. The computer program implementing the preferred embodiment of the invention 2207 is configured by the user or system defined policy 2206 which determines templates and programs for features of the target applications and prompts for collecting the user annotation 2204. Processed information is saved into various formats for different applications in the system 2208, 2209, and 2210. A consecutive process can be invoked to perform further tasks on the saved and linked, if required, data according to the objective of the system 2211.

Figure 23A:
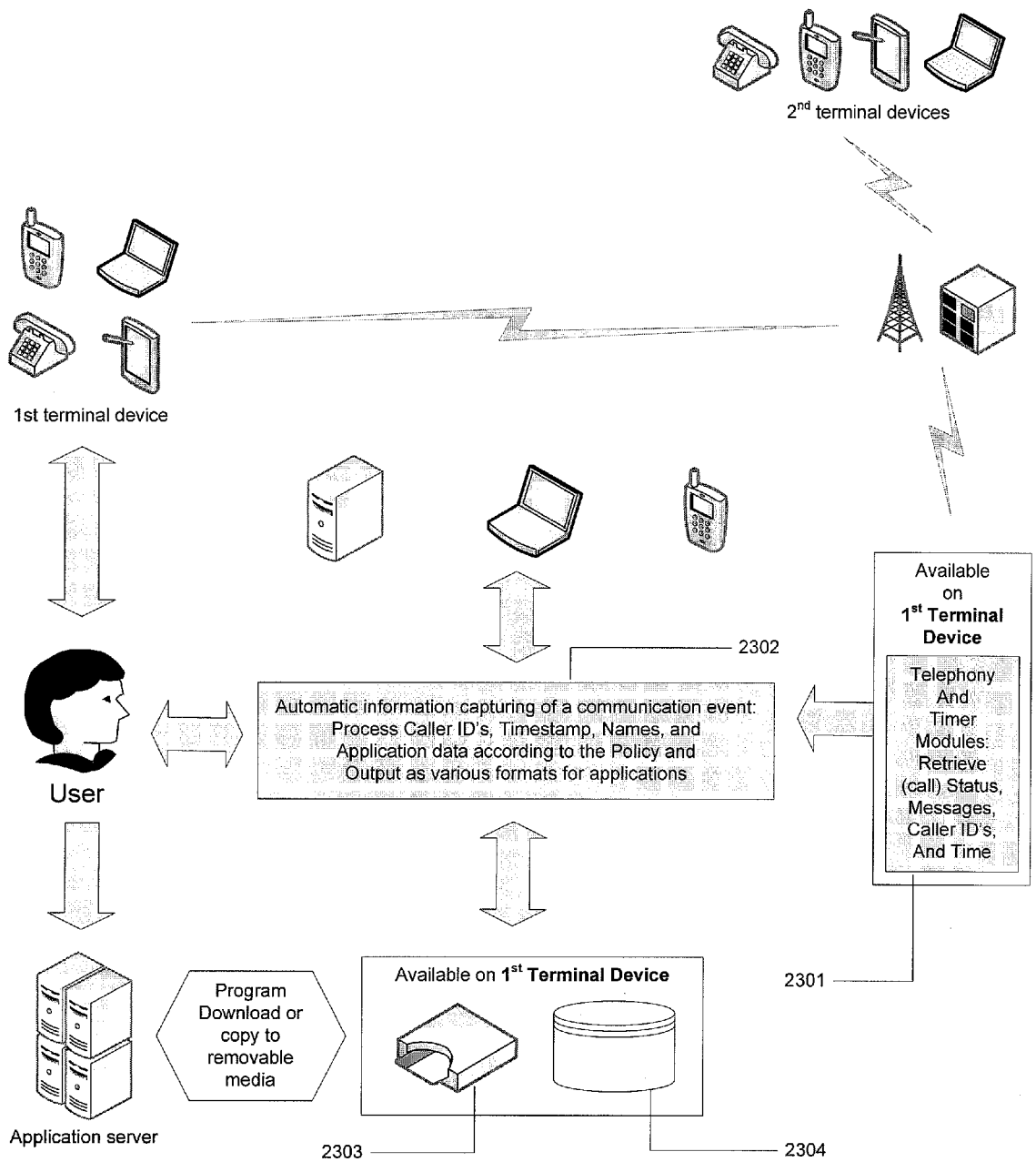
FIG. 23A is a functional block diagram of a system encapsulating a computer program implementing the invention.

The computer program implementing the invention 2302 can be downloaded to a storage medium by a user as shown in FIG. 23A. The storage medium can be a removable card 2303, for example, or a persistent storage device 2304 available to the user at the first communication terminal device. The computer program can be invoked automatically (or "woke up") by an in-progress communication event 2301 to capture related information from the user, application data, and the communication event for further processing at a higher system level as shown in FIG. 22.

Figure 23B:
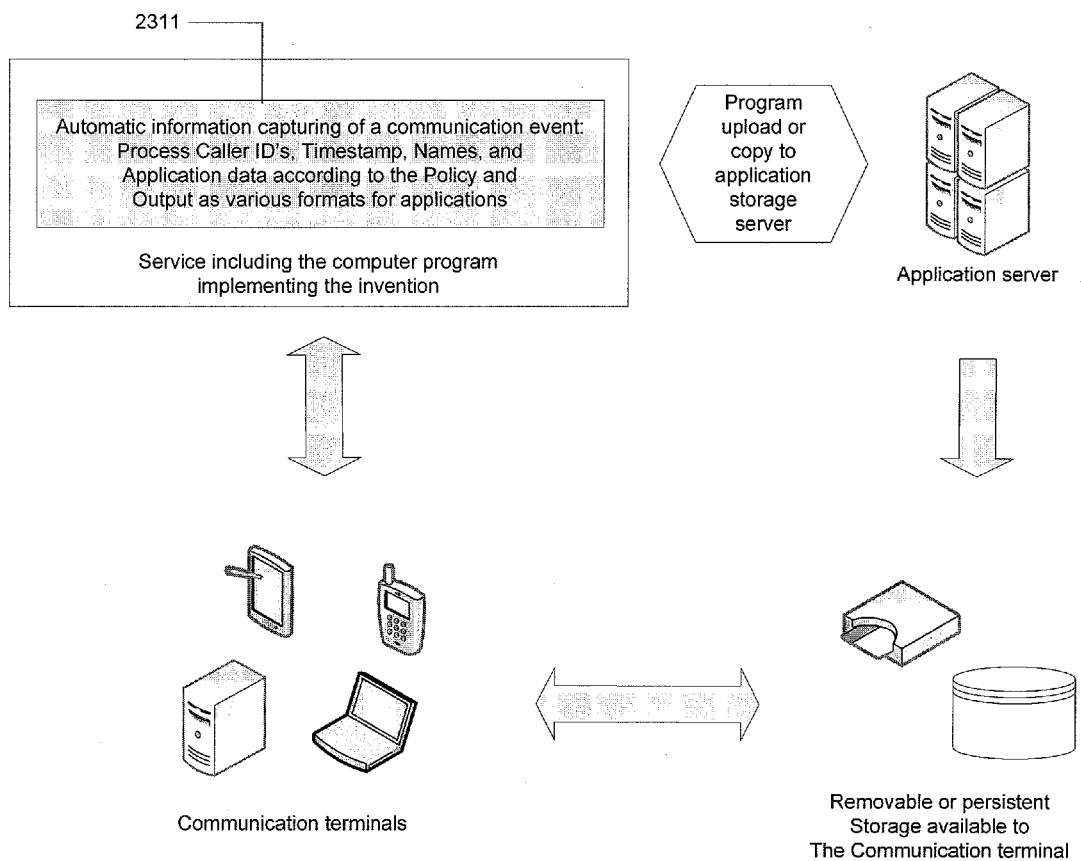
FIG. 23B is a functional block diagram of a system uploading a computer program implementing the invention for possible re-packaging and re-distribution.

A content or application service center can upload the computer program implementing the invention 2311 to a server as shown in FIG. 23B. The application server can package the computer program with related application and redistribute it to the storage of the terminal devices for an integrated communication event-driven service on the terminal devices.

The asynchronous program download in FIG. 23A and communication event-driven information capturing in a system encapsulating the invention is shown in FIG. 24. The user can download the computer program implementing the invention 2401 to a storage medium 2402 via the same or different communication network where the communication event takes place. Or the user can install the computer program implementing the invention 2401 to a storage medium 2402 from a removable media reader device. When the communication event takes place 2403, the commonly available telephony and timer modules on the communication terminal extracts communication status, caller ID's, and event time 2404. The "in-progress" call status and the availability of the computer program are checked 2406 to determine whether to proceed to the information annotation or to a system defined handling on a communication event 2407 such as simply connect the call or route the call to a voice mail if not answered.

If the communication establishes successfully and the computer program is ready for use, the system invokes the computer program implementing the invention 2408. The program will fetch and process 2409 related information from the communication event 2405, user settings, application data 2410, policy for target applications 2411, and user annotation to the event 2412. Various application data are generated for next level information processing 2413, 2414, and 2415.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for implementing a user policy at a first electronic device to link information concerning a telephony communication event with a telephone number or Internet Protocol address associated with a second electronic device, said telephony communication event occurring in telephonic communication between said first device and a second electronic device, said method comprising:
   receiving at the first device the information that concerns the telephone number or Internet Protocol address associated with said second electronic device, and through which said second electronic device is in telephonic communication with the first electronic device;
   receiving at the first device information that identifies the time of said telephony communication event;
   checking a memory available at the first device whether the user policy is to link the information that concerns the telephone number or Internet Protocol address associated with said second electronic device and information regarding the telephony communication event; and
   creating pointers so that the information that concerns the telephone number or Internet Protocol address associated with said second electronic device is linked with the time of said telephony communication event only if the linking is in accordance with the user policy.

2. The method of claim 1, said method further comprising storing at the first device information concerning the user policy and information concerning the telephony communication event.

3. A computer readable storage device embodying a program of instructions executable by a computer to perform a method for implementing a user policy at a first electronic device to link information concerning a telephony communication event with a telephone number or Internet Protocol address associated with a second electronic device, said telephony communication event occurring in telephonic communication between said first device and a second electronic device, said method comprising:
   receiving at the first device the information that concerns the telephone number or Internet Protocol address associated with said second electronic device, and through which said second electronic device is in telephonic communication with the first electronic device;
   receiving at the first device information that identifies the time of said telephony communication event;
   checking a memory available at the first device whether the user policy is to link the information that concerns the telephone number or Internet Protocol address associated with said second electronic device and information regarding the telephony communication event; and
   creating pointers so that the information that concerns the telephone number or Internet Protocol address associated with said second electronic device is linked with the time of said telephony communication event only if the linking is in accordance with the user policy.

4. A method for a user to set a policy at a first electronic device to link information concerning a telephony communication event with a telephone number or Internet Protocol address associated with a second electronic device, said telephony communication event occurring in telephonic communication between said first device and a second electronic device, said method comprising:
   receiving at the first device the information that concerns the telephone number or Internet Protocol address associated with said second electronic device, and through which said second electronic device is in telephonic communication with the first electronic device;
   receiving at the first device information that identifies the time of said telephony communication event;
   prompting the user on whether to link the information that concerns the telephone number or Internet Protocol address associated with said second electronic device and the information regarding the telephony communication event;

creating pointers so that the information that concerns the telephone number or Internet Protocol address associated with said second electronic device is linked with the time of said telephony communication event when an user input indicates that the user wished to link the information that concerns the telephone number or Internet Protocol address associated with said second electronic device with the time of said telephony communication event.

5. A computer readable storage device embodying a program of instructions executable by a computer to perform a method for setting a policy at a first electronic device to link information concerning a telephony communication event with a telephone number or Internet Protocol address associated with a second electronic device, said telephony communication event occurring in telephonic communication between said first device and a second electronic device, said method comprising:

receiving at the first device the information that concerns the telephone number or Internet Protocol address associated with said second electronic device, and through which said second electronic device is in telephonic communication with the first electronic device;

receiving at the first device information that identifies the time of said telephony communication event;

prompting the user on whether to link the information that concerns the telephone number or Internet Protocol address associated with said second electronic device and the information regarding the telephony communication event;

creating pointers so that the information that concerns the telephone number or Internet Protocol address associated with said second electronic devices is linked with the time of said telephony communication event when an user input indicated that the user wished to link the information that concerns the telephone number or Internet Protocol address associated with said second electronic device with the time of said telephony communication event.

6. A method for linking at a first electronic device information concerning a telephony communication event with a telephone number or Internet Protocol address associated with a second electronic device, said telephony communication event occurring in telephonic communication between said first devices and a second electronic device, said method comprising:

receiving at the first device the information that concerns the telephone number or Internet Protocol address associated with said second electronic device, and through which said second electronic device is in telephonic communication with the first electronic device;

receiving at the first device information that identifies the time of said telephony communication event;

creating pointers so that the information that concerns the telephone number or Internet Protocol address associated with said second electronic device is linked with the time of said telephony communication event; and storing at the first device the information that concerns the telephone number of Internet Protocol address associated with said second electronic device, information regarding the telephony communication event and the pointers.

7. The method of claim 6, wherein the pointers are created by setting to predetermined values one or more flag bits in a memory available at the first device storing the information that concerns the telephone number or Internet Protocol address associated with said second electronic device, and information regarding the telephony communication event.

8. A computer readable storage device embodying a program of instructions executable by a computer to perform a method for linking at a first electronic device information concerning a telephony communication event with a telephone number or Internet Protocol address associated with a second electronic device, said telephony communication event occurring in telephonic communication between said first device and a second electronic device, said method comprising:

receiving at the first device the information that concerns the telephone number or Internet Protocol address associated with said second electronic device, and through which said second electronic device is in telephonic communication with the first electronic device;

receiving at the first device information that identifies the time of said telephony communication event;

creating pointers so that the information that concerns the telephone number or Internet Protocol address associated with said second electronic device is linked with the time of said telephony communication event; and storing at the first device the information that concerns the telephone number or Internet Protocol address associated with said second electronic device, information regarding the telephony communication event and the pointers.

9. A computer readable storage device embodying a program of instructions executable by a computer to perform a method for capturing user annotation at a first electronic device and information concerning a telephony communication event with a telephone number or Internet Protocol address associated with a second electronic device, said telephony communication event occurring in telephonic communication between said first device and a second electronic device, said method comprising:

receiving at the first device the information that concerns the telephone number or Internet Protocol address associated with said second electronic device, and through which said second electronic device is in telephonic communication with the first electronic device;

receiving at the first device information that identifies the time of said telephony communication event;

checking in a directory in a storage available at the first device, a person's name associated with said telephone number or Internet Protocol address;

creating application data and commands associated with a user policy so that the information that concerns the telephone number or Internet Protocol address associated with said second electronic device is linked with the time of said telephony communication event; and storing at the first device the information that concerns the telephone number or Internet Protocol address associated with said second electronic device, information regarding the telephony communication event and information for applications associated with a user policy concerning the telephony communication event.

10. The device of claim 9, wherein in said creating, the first device automatically creates with methods available at the first device, information concerning the user annotation and the telephony communication event and information concerning the person's name associated with said telephone number or Internet Protocol address, if found, or the information that identifies the telephone number or Internet Protocol address.

11. The device of claim 10, wherein in said creating, the first device automatically disintegrates with methods available at the first device, information associating with the user annotation and the telephony communication event and information concerning the person's name associated with said telephone number or Internet Protocol address, if found, or the information that identifies the telephone number or Internet Protocol address.

12. The device of claim 10, wherein in said creating, the first device automatically assembles with methods available at the first device, information concerning the user annotation and the telephony communication event, information for computer programs concerning the user policy, and information concerning the person's name associated with said telephone number or Internet Protocol address, if found, or the information that identifies the telephone number or Internet Protocol address.

13. The device of claim 9, wherein in said storing, the first device automatically stores in a designated application data format in a storage available at the first device, information associating with the user annotation and the telephony communication event and information concerning the person's name associated with said telephone number or Internet Protocol address, if found, or the information that identifies the telephone number or Internet Protocol address.

* * * * *